United States Patent
Iwatsu

(10) Patent No.: US 6,792,476 B1
(45) Date of Patent: Sep. 14, 2004

(54) STORAGE MEDIUM, AND METHOD AND APPARATUS FOR INFORMATION PROCESSING

(75) Inventor: Takeshi Iwatsu, Saitama (JP)

(73) Assignee: Sony Corporation, Tokyo (JP)

( * ) Notice: Subject to any disclaimer, the term of this patent is extended or adjusted under 35 U.S.C. 154(b) by 493 days.

(21) Appl. No.: 09/869,658
(22) PCT Filed: Oct. 27, 2000
(86) PCT No.: PCT/JP00/07549
§ 371 (c)(1),
(2), (4) Date: Jun. 28, 2001
(87) PCT Pub. No.: WO01/33372
PCT Pub. Date: May 10, 2001

(30) Foreign Application Priority Data

| Oct. 29, 1999 | (JP) | 11-308673 |
| Oct. 29, 1999 | (JP) | 11-308674 |
| Oct. 25, 2000 | (JP) | 2000-325218 |
| Oct. 25, 2000 | (JP) | 2000-325219 |

(51) Int. Cl.$^7$ .............................................. G06F 13/14
(52) U.S. Cl. ........................ 710/5; 710/39; 710/52; 348/316; 375/240.01; 375/240.03; 375/240.15
(58) Field of Search ................. 710/5, 39, 52; 375/240.1, 240.03, 240.15, 240.01; 348/316

(56) References Cited

U.S. PATENT DOCUMENTS

| 5,844,609 A | * 12/1998 | Filor et al. ............ 375/240.01 |
| 5,968,146 A | 10/1999 | Tanaka et al. |
| 6,075,899 A | * 6/2000 | Yoshioka et al. ............ 382/233 |
| 6,188,727 B1 | * 2/2001 | Lee ........................ 375/240.03 |
| 6,212,231 B1 | * 4/2001 | Takano .................. 375/240.24 |
| 6,542,541 B1 | * 4/2003 | Luna et al. ............ 375/240.01 |

FOREIGN PATENT DOCUMENTS

| JP | 5-334224 | 12/1993 |
| JP | 7-200420 | 8/1995 |
| JP | 9-259067 | 10/1997 |

* cited by examiner

Primary Examiner—A. Elamin
(74) Attorney, Agent, or Firm—Frommer Lawrence & Haug LLP; William S. Frommer; Darren M. Simon

(57) ABSTRACT

An information processing apparatus, disposed between a controlling portion and hardware, for performing a process corresponding to a program that contains capsulated process portions for controlling the hardware in response to messages received from the controlling portion. The program includes a first process portion for communicating with the controlling portion; a second process portion for communicating with first and second hardware; a third process portion for communicating with the first process portion and the second process portion and executing an interfacing process corresponding to the first hardware; and a fourth process portion for communicating with the first process portion and the second process portion and executing an interfacing process corresponding to the second hardware. The first process portion outputs a message to either the third process portion or the fourth process portion corresponding to a message received from the controlling portion.

22 Claims, 22 Drawing Sheets

MUSIC DELIVERY SERVICE SYSTEM

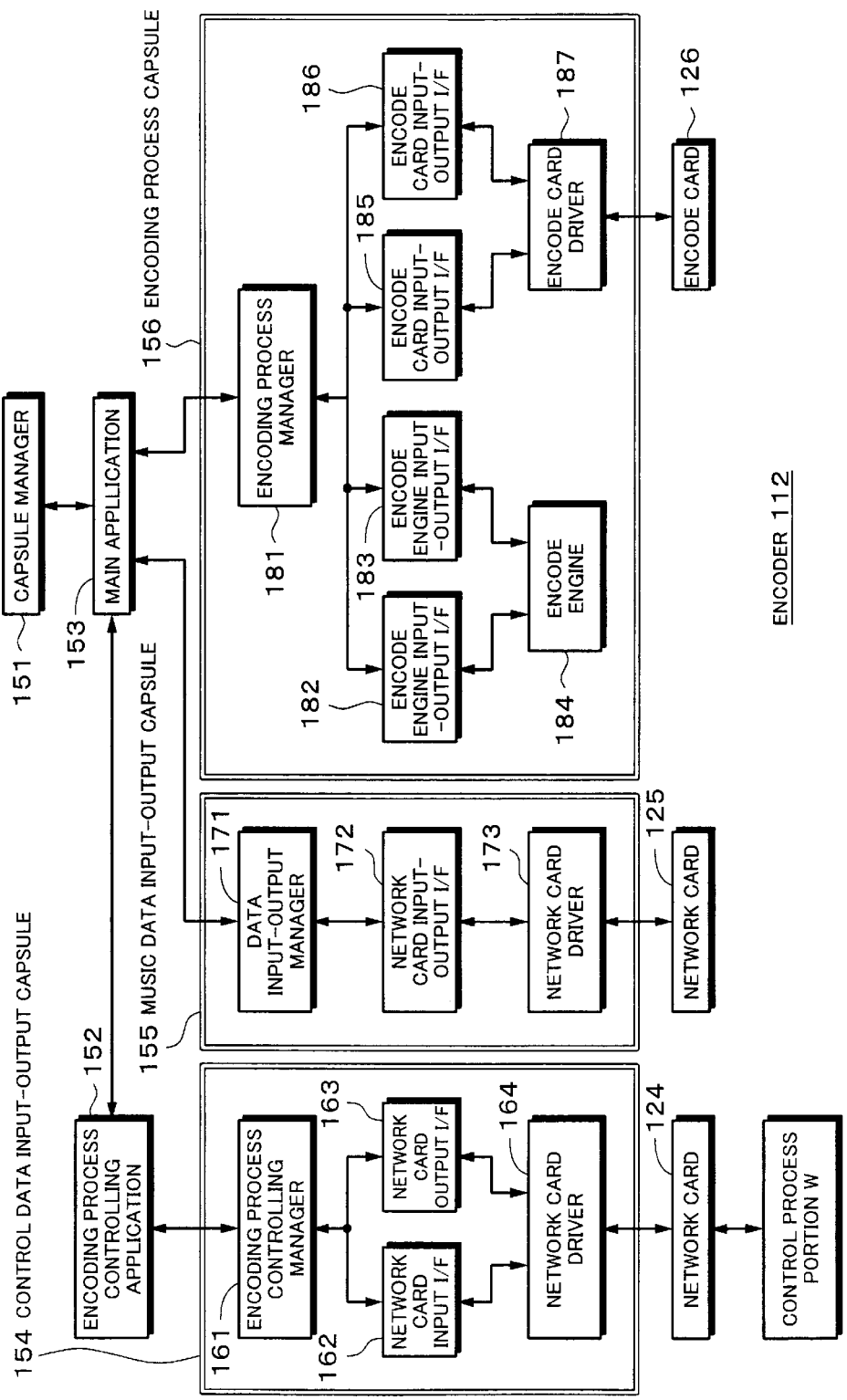

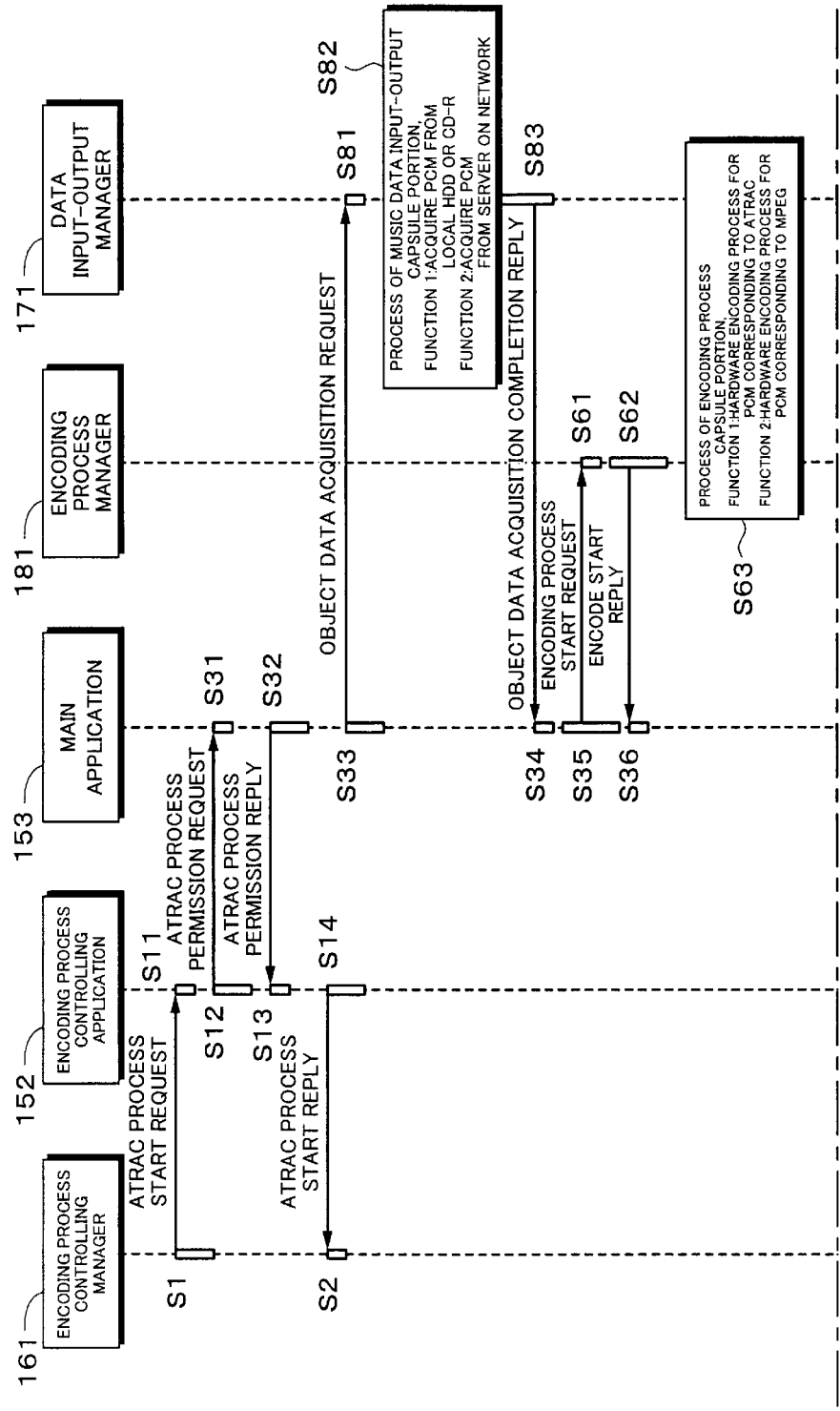

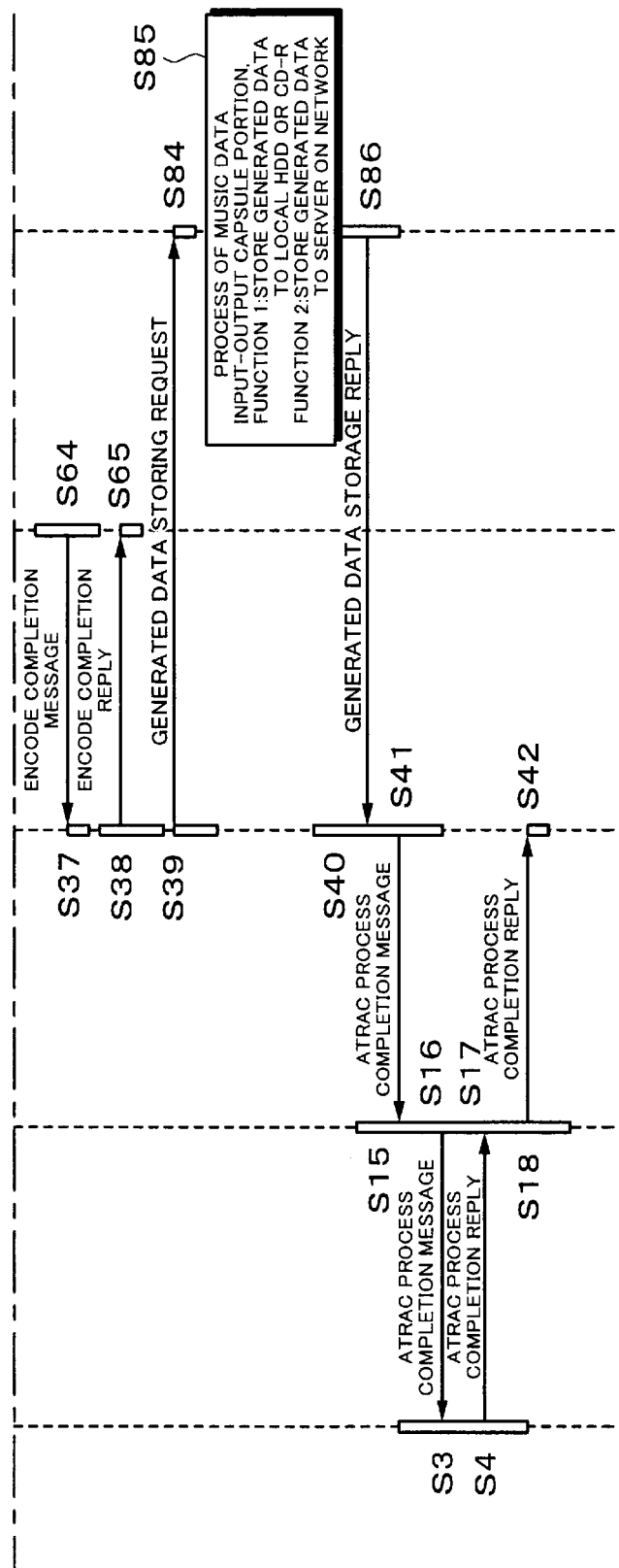

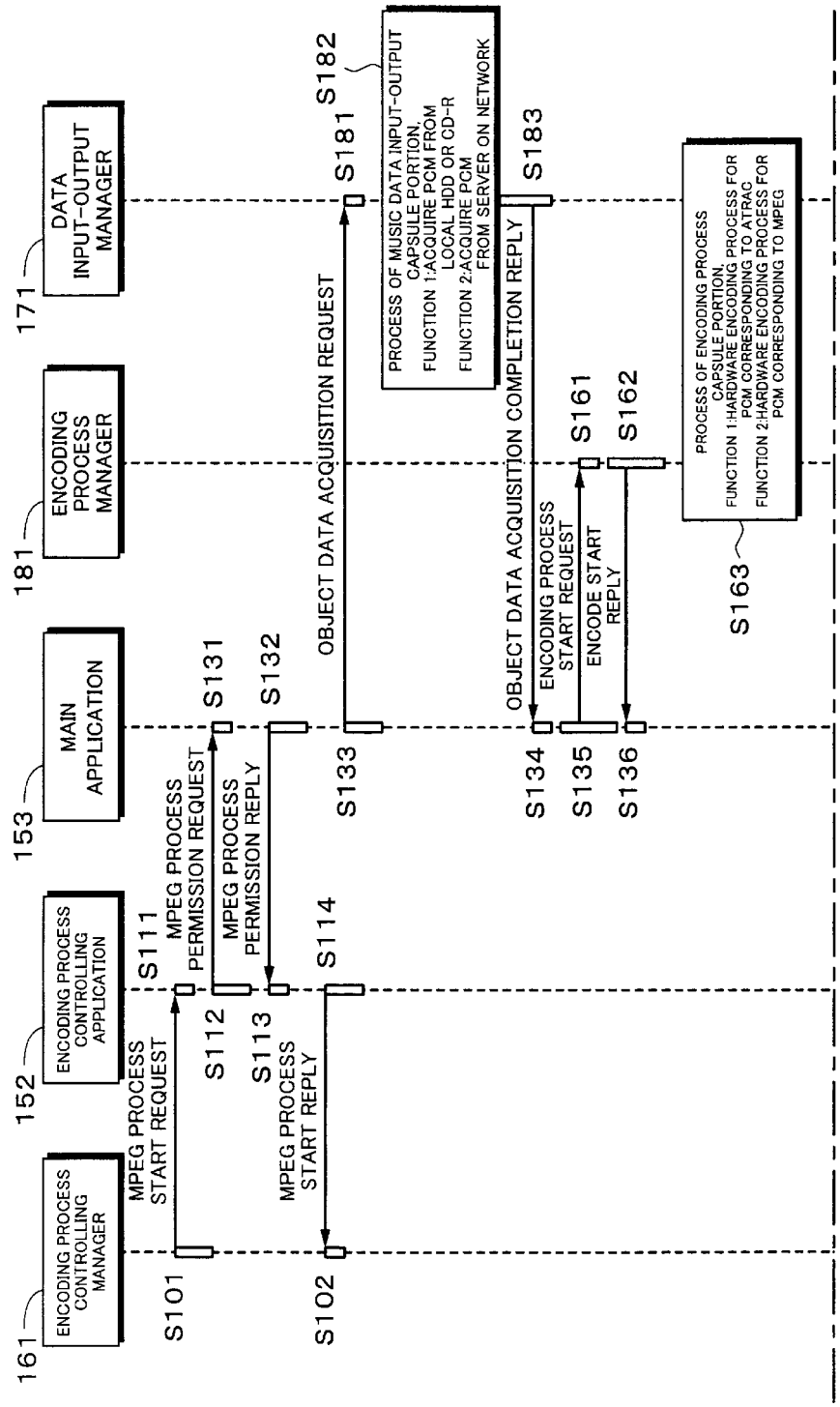

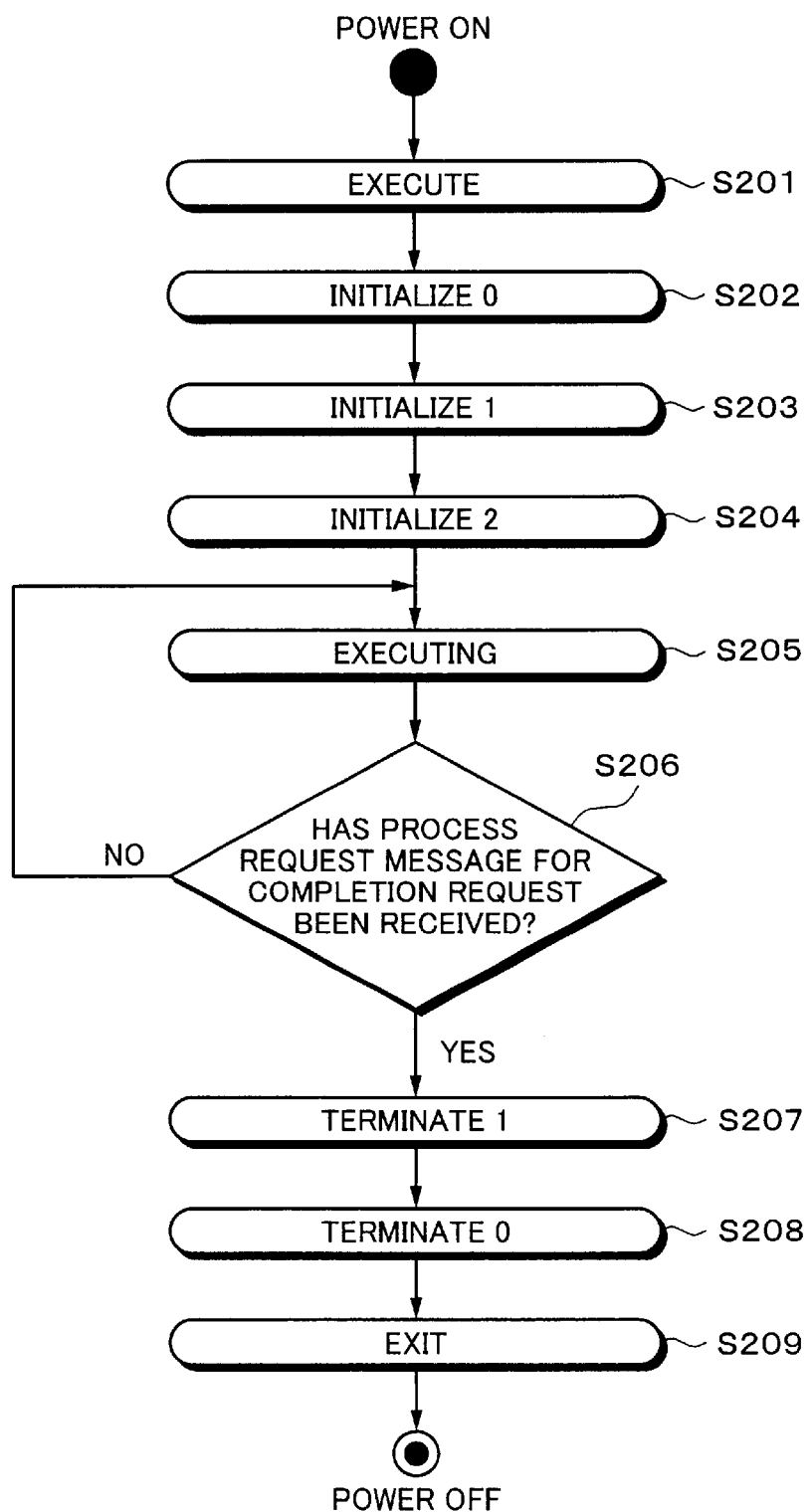

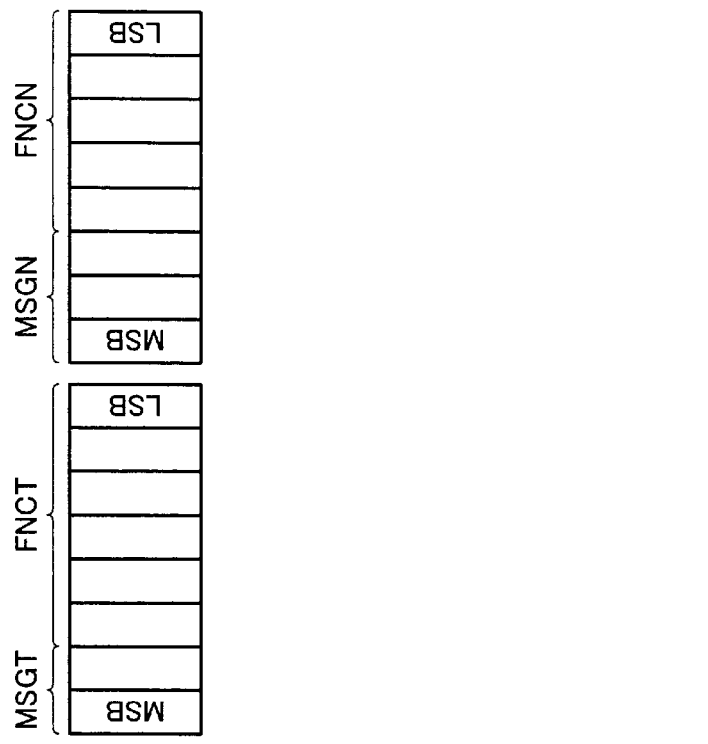
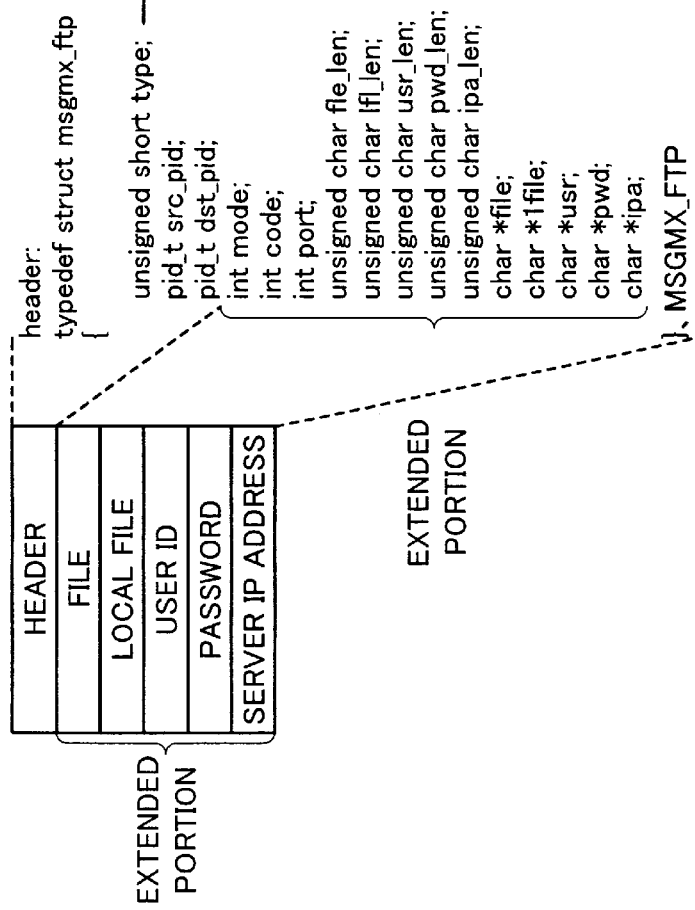

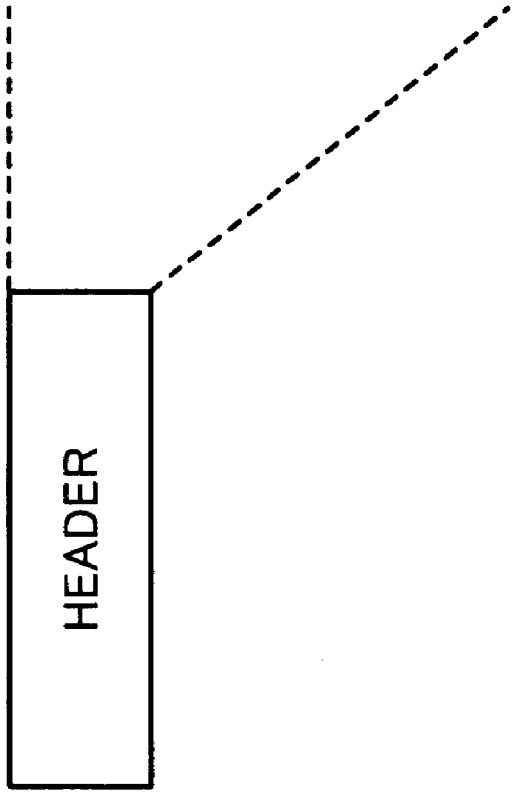

MUSIC DELIVERY SERVICE SYSTEM

US 6,792,476 B1

STORAGE MEDIUM, AND METHOD AND APPARATUS FOR INFORMATION PROCESSING

TECHNICAL FIELD

The present invention relates to a record medium, an information processing apparatus, and a method, in particular to, those that allow a hardware device necessary for processing information to be easily changed or modified.

In addition, the present invention relates to a record medium, an information processing apparatus, a method that allow a current process to be quickly restored from an abnormality.

BACKGROUND ART

FIG. 1 shows an example of the functional structure of an encoder 10 that composes a delivery side apparatus of a conventional music delivery service system (an example of the structure of a program for an encoding process). The delivery side apparatus of the music delivery service system comprises the encoder 10, a controlling terminal unit (not shown), and a server (not shown). The controlling terminal unit controls the encoding process of the encoder 10. The server supplies music data that is encoded (hereinafter, referred to as PCM (Pulse Code Modulation) non-compressed music data) to the encoder 10, stores music data encoded by the encoder 10 (hereinafter, this data is referred to as PCM compressed music data), and delivers the PCM compressed music data to a user (reception side) of the music delivery service.

The encoder 10 contains hardware devices that are a (first) network card, a (second) network card, and an encode card. The first network card controls a communication with an alarm LAN (alarm Local Area network) to which control data for controlling the encoding process is transferred. The second network card controls a communication with a medium LAN to which PCM non-compressed music data and PCM compressed music data (hereinafter, when it is not necessary to distinguish them, they are simply referred to as music data). The encode card executes the encoding process.

The program for the encoding process shown in FIG. 1 is composed of five process portions (elements denoted by solid line boxes) that are a control data input—output process portion 11, a network card driver process portion 12, a main process portion 13, a network card driver process portion 14, and an encode card driver process portion 15. Each process portion is composed of an executable program. Each process portion manages data areas (such as buffers and registers). Each process portion is independently executed.

The control data input—output process portion 11 communicates with the main process portion 13. The control data input—output process portion 11 receives various commands for the encoding process from the controlling terminal unit through the network card driver process portion 12 and outputs the received commands to the main process portion 13. In addition, the control data input—output process portion 11 outputs messages supplied from the main process portion 13 (the messages are for example a message that represents that the encoding process has been successfully completed and an error message that represents that the encoding process has failed) to the controlling terminal unit through the network card driver process portion 12. When it is not necessary to distinguish commands and error messages exchanged between the control data input—output process portion 11 and the main process portion 13, they are simply referred to as control data.

The main process portion 13 receives for example PCM non-compressed music data from the server (not shown) through the network card driver process portion 14. The network card driver process portion 14 supplies the received PCM non-compressed music data to the encode card through the encode card driver process portion 15. In addition, the main process portion 13 controls the encode card through the encode card driver process portion 15 so as to execute the encoding process corresponding to control data supplied from the control data input—output process portion 11. In this example, the encode card executes an encoding process corresponding to the MPEG (Moving Picture Experts Group) 1 layer 2 standard with a sampling frequency of 48 KHz (hereinafter, this encoding process is referred to as MPEG 1 based encoding process) or an encoding process corresponding to ATRAC (adaptive transform acoustic coding) 1 (trademark) standard with a sampling frequency of 44.1 KHz (hereinafter, this encoding process is referred to as ATRAC 1 based encoding process).

The main process portion 13 receives PCM compressed music data that has been encoded from the encode card through the encode card driver process portion 15 and supplies the received data to the server through the network card driver process portion 14.

Next, the control data input—output process portion 11 and the main process portion 13 will be described. The control data input—output process portion 11 is composed of three programs (elements denoted by dotted line boxes in FIG. 1) that are a controlling portion 21, a network card input I/F (interface) 22, and a network card output I/F 23 and data areas necessary for executing those programs.

The network card input I/F 22 receives control data from the controlling terminal unit through the network card driver process portion 12 and outputs the received control data to the controlling portion 21. The network card output I/F 23 receives for example an error message from the main process portion 13 through the controlling portion 21 and outputs the received error message to the network card driver process portion 12.

The controlling portion 21 controls the network card input I/F 22 and the network card output I/F 23. In addition, the controlling portion 21 communicates with a controlling portion 31 of the main process portion 13.

Next, the structure of the main process portion 13 will be described. The main process portion 13 comprises seven programs (elements denoted by dotted boxes) that are a controlling portion 31, a network card input—output I/F 32, an encode engine input—output I/F 33, an encode engine input—output I/F 34, an encode engine 35, an encode card input—output I/F 36, and an encode card input—output I/F 37 and data areas necessary for executing those programs.

The network card input—output I/F 32 receives PCM non-compressed music data through the network card driver process portion 14 and outputs the received data to the controlling portion 31. In addition, the network card input—output I/F 32 receives PCM compressed music data from the controlling portion 31 and outputs the data to the network card driver process portion 14.

The encode engine input—output I/F 33 receives PCM non-compressed music data that is encoded corresponding to the ATRAC 1 based encoding process through the controlling portion 31 and outputs the received PCM non-compressed music data to the encode engine 35. In addition, the encode engine input—output I/F 33 receives PCM compressed music data that has been encoded corresponding to the ATRAC 1 based encoding process from the encode engine 35 and outputs the received PCM compressed music data to the controlling portion 31.

The encode engine input—output I/F 34 receives PCM non-compressed music data that is encoded corresponding to the MPEG 1 based encoding process through the controlling portion 31 and outputs the received PCM non-compressed music data to the encode engine 35. In addition, the encode engine input—output I/F 34 receives PCM compressed music data that has been encoded corresponding to the MPEG 1 based encoding process from the encode engine 35 and outputs the received PCM compressed music data to the controlling portion 31.

The encode card input—output I/F 36 receives PCM non-compressed music data that is encoded corresponding to the ATRAC 1 based encoding process through the controlling portion 31 and outputs the received PCM non-compressed music data to the encode card driver process portion 15. In addition, the encode card input—output I/F 36 receives PCM compressed music data that has been encoded corresponding to the ATRAC 1 based encoding process from the encode card driver process portion 15 and outputs the received PCM compressed music data to the controlling portion 31.

The encode card input—output I/F 37 receives PCM non-compressed music data that is encoded corresponding to the MPEG 1 based encoding process through the controlling portion 31 and outputs the received PCM non-compressed music data to the encode card driver process portion 15. In addition, the encode card input—output I/F 37 receives PCM compressed music data that has been encoded corresponding to the MPEG 1 based encoding process from the encode card driver process portion 15 and outputs the received PCM compressed music data to the controlling portion 31.

As a software process, the encode engine 35 encodes PCM non-compressed music data supplied from the encode engine input—output I/F 33 and the encode engine input—output I/F 34 corresponding to the ATRAC 1 based encoding process and the MPEG 1 based encoding process and outputs the encoded PCM compressed music data to the encode engine input—output I/F 33 and the encode engine input—output I/F 34.

Although the encoder 10 is structured as described above, each program that composes the control data input—output process portion 11 to the encode card driver process portion 15 is structured depending on predetermined hardware devices such as the network cards and the encode card of the encoder 10.

Thus, when the network cards and encode card of the encoder 10 are changed or extended corresponding to a transmission medium such as the Internet, a digital satellite broadcast, or a ground wave digital broadcast, each process portion should be restructured using time and cost.

In addition, for example, interface programs that control the network cards and encode card as hardware devices disposed in the encoder 10 (these interface programs are the network card input I/F 22, the network card output I/F 23, and the network card input—output I/F 32 to the encode card input—output I/F 37) and driver programs (these programs are the network card driver process portions 12 and 14 and the encode card driver process portion 15) are created by the manufacturer of the encoder 10.

However, when the function of a hardware device as one part of the encoder 10 is more improved, it will be ineffective for the manufacturer of the encoder 10 to create interface programs and driver programs for a hardware device assembled to the encoder 10. Thus, the manufacture of a hardware device creates a relevant program and supplies the created program and the hardware device to the manufacture of the encoder 10.

In such a situation, since the manufacture of the encoder 10 does not know the detail of a hardware device as a part of the encoder 10, it becomes difficult for the manufacture of the encoder 10 to create the controlling portion 21 and the controlling portion 31 that control the encoder 10. Thus, it becomes more difficult to change or extend the hardware device.

In addition, although the encoder 10 is structured as described above, when an abnormality takes place in a process of a program, the process of the program is temporarily terminated. Thus, it takes long time to restore the process from the abnormality.

DISCLOSURE OF THE INVENTION

The present invention is made from the above-described point of view. An object of the present invention is to allow a hardware device to be easily changed or extended.

Another object of the present invention is to allow a process of a program to be quickly restored from a failure state.

The present invention is a record medium for recording a computer controllable program, the program being disposed between a controlling portion and hardware, the program controlling the hardware corresponding to a message received from the controlling portion, the program comprising a first process portion for communicating with the controlling portion, a second process portion for being communicable with first hardware and second hardware, a third process portion for communicating with the first process portion and the second process portion and executing an interfacing process corresponding to the first hardware, and a fourth process portion for communicating with the first process portion and the second process portion and executing an interfacing process corresponding to the second hardware, wherein the first process portion outputs a message to one of the third process portion and the fourth process portion corresponding to a message received from the controlling portion.

The present invention is a storage medium for storing a computer controllable program, disposed between a controlling portion and hardware, for controlling the hardware corresponding to a message received from the controlling portion, the program containing capsulated process portions, wherein if an abnormality takes place in each process portion, it is initialized in one of a first path for initializing a first buffer for exchanging data with the hardware, a second path for unallocating a second buffer for exchanging data with the controlling portion, allocating the second buffer, initializing the second buffer, and initializing the first buffer, and a third path for unallocating the second buffer and unallocating the first buffer.

BRIEF DESCRIPTION OF DRAWINGS

FIG. 6 is a schematic diagram showing an example of the structure of the encoder shown in FIG. 2;

FIGS. 7A and 7B are schematic diagrams for explaining an ATRAC encoding process of the process shown in FIG. 6;

FIGS. 8A and 8B are schematic diagrams for explaining an MPEG encoding process of process portions shown in FIG. 6;

FIG. 10 is a flow chart for explaining an initializing process in a normal state;

FIGS. 11A to 11C are schematic diagrams for explaining the structure of an inter process portion communication message;

FIGS. 12A and 12B are schematic diagrams for explaining another structure of an inter process portion communication message;

BEST MODE FOR CARRYING OUT THE INVENTION

Figure 1:
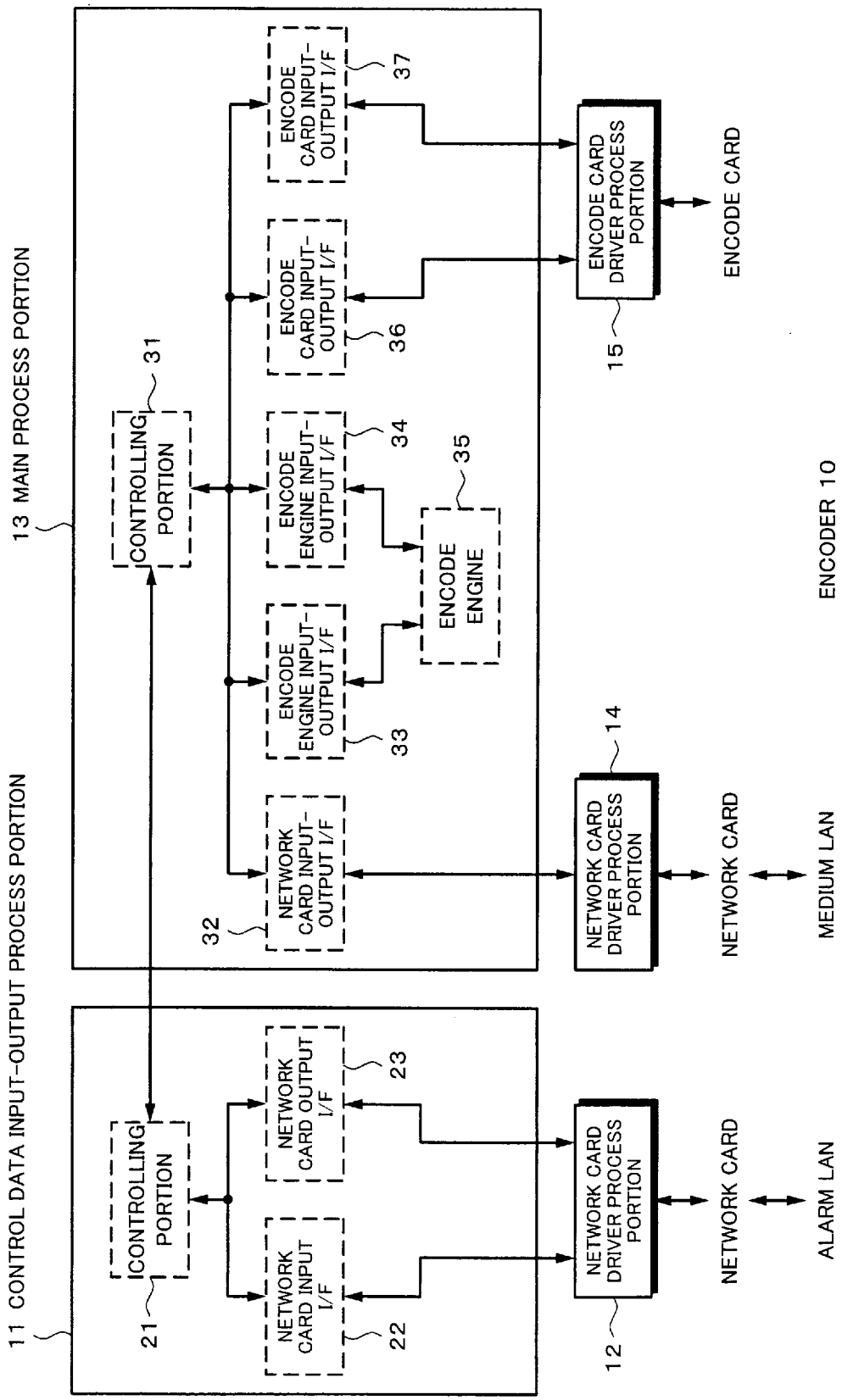
FIG. 1 is a block diagram showing an example of the functional structure of a conventional encoder.
Figure 2:
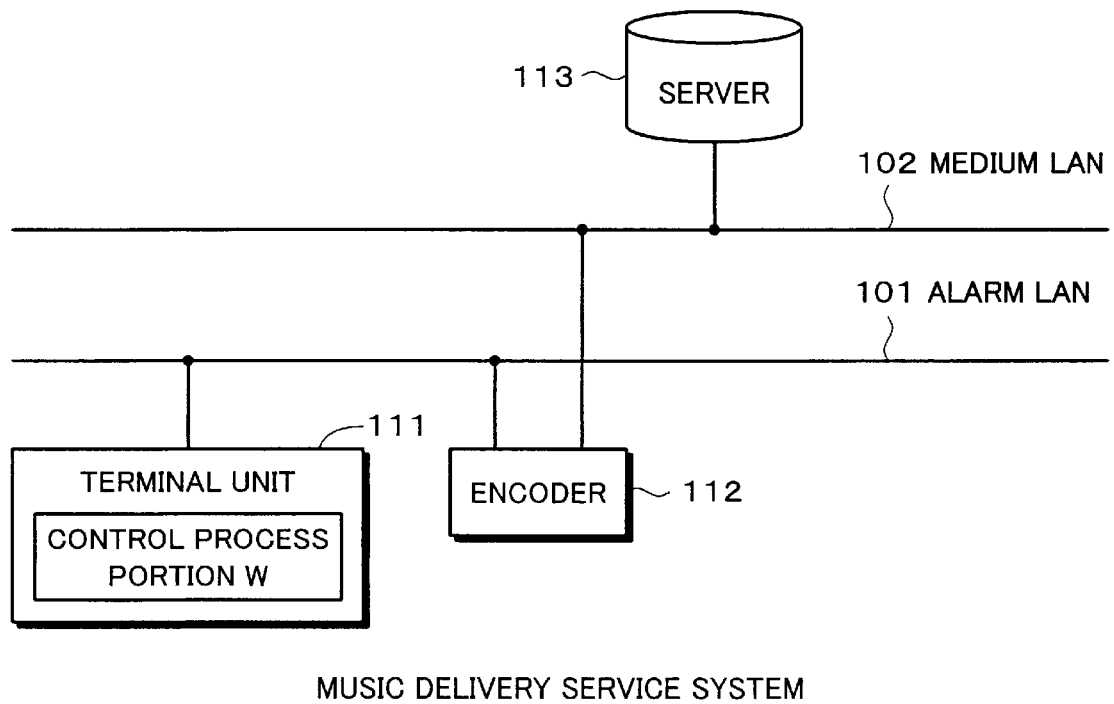
FIG. 2 is a schematic diagram showing an example of the structure of a music delivery service system according to the present invention.

FIG. 2 shows an example of the structure of the delivery side of a music delivery service system according to the present invention. In this example, an alarm LAN 101 and a medium LAN 102 corresponding to the 100 BASE-TX Ethernet (trademark) are disposed. A terminal unit 111 and an encoder 112 are connected to the alarm LAN 101. The encoder 112 and a server 113 are connected to the medium LAN 102.

The terminal unit 111 has a control process portion W composed of a program that controls the encoder 112. Under the control of the control process portion W, the terminal unit 111 communicates with the encoder 112 through the alarm LAN 101 and causes the encoder 112 to execute a predetermined encoding process.

The encoder 112 is controlled by the terminal unit 111. The encoder 112 receives PCM non-compressed music data such as CD-DA (Compact Disc—Digital Audio) stored in the server 113 through the medium LAN 102 and executes the encoding process corresponding to the ATRAC 1 standard or MPEG 1 audio layer 3 (so-called MP3) standard. In addition, the encoder 112 transfers PCM compressed music data that has been encoded to the server 113 through the medium LAN 102 corresponding to for example file transfer base (file transfer protocol: ftp).

The server 113 records PCM non-compressed music data and supplies the data to the encoder 112. In addition, the server 113 records PCM compressed music data received from the encoder 112 and when necessary delivers the data to a user (reception side) of the music delivery service.

Thus, since the alarm LAN 101 that transfers control data and the medium LAN 102 that transfers music data are independently disposed, the encoding process and the music data delivering process can be more effectively performed.

Figure 3:
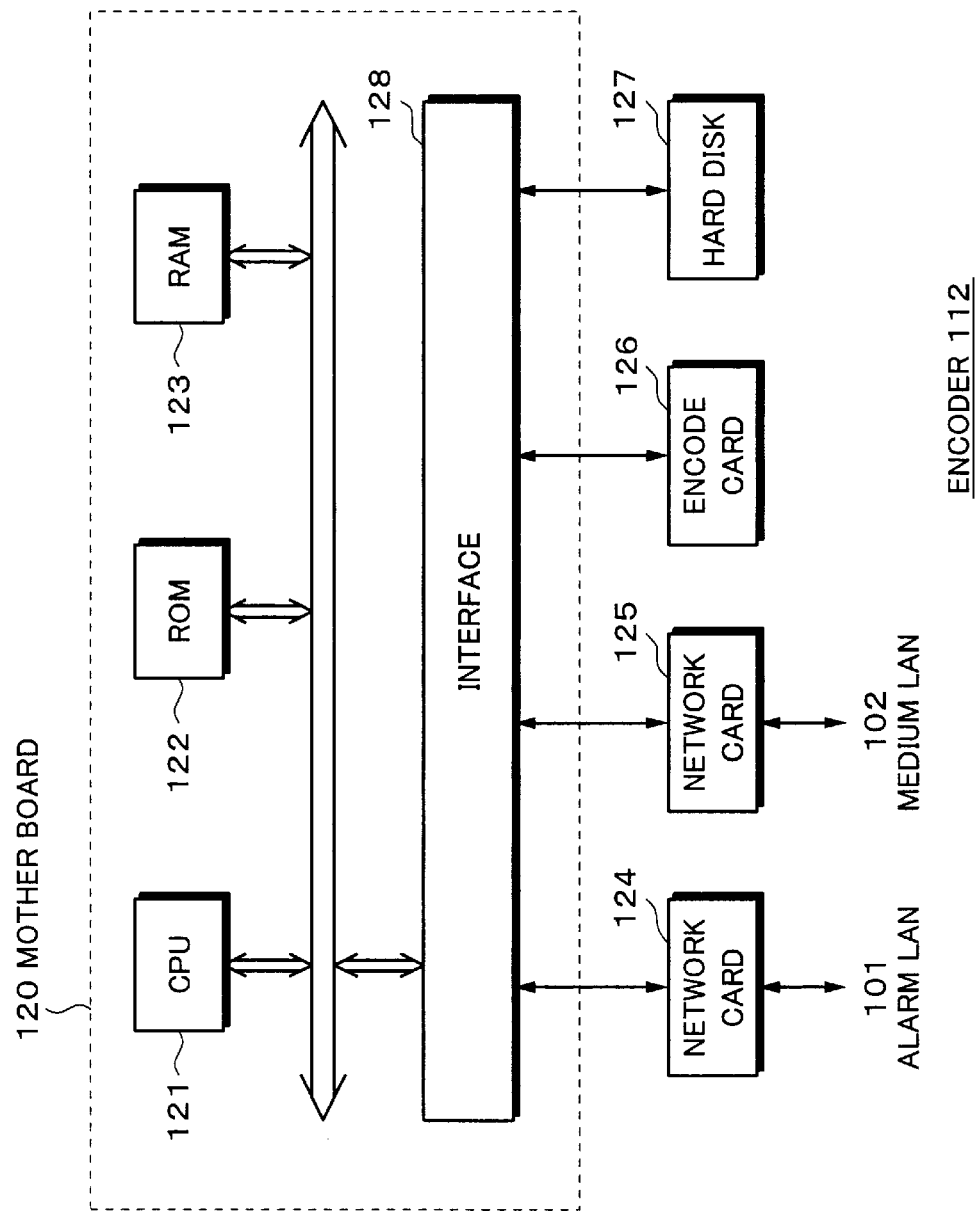
FIG. 3 is a schematic diagram showing an example of the structure of an encoder shown in FIG. 2.

FIG. 3 shows an example of the structure of the encoder 112. A CPU (Central Processing Unit) 121 expands for example an encoding process program stored in a ROM (Read Only Memory) 122 or a hard disk 127 to a RAM (Random Access Memory) 123 and executes the encoding process corresponding to the encoding process program. The RAM 123 temporarily stores data necessary for executing for example the encoding process. In the RAM 123, a necessary data buffer area is allocated.

A network card 124 is connected to the alarm LAN 101. The network card 124 receives and transmits control data through the alarm LAN 101.

A network card 125 is connected to the medium LAN 102. The network card 125 receives PCM non-compressed music data from the server 113 through the medium LAN 102 and transmits PCM compressed music data that has been encoded by an encode card 126 to the server 113.

The encode card 126 receives PCM non-compressed music data from the network card 125 and encodes the PCM non-compressed music data corresponding to the ATRAC 1 based encoding process or the MPEG 1 based encoding process.

The hard disk 127 stores programs executed by the CPU 121. In addition, the hard disk 127 stores the PCM non-compressed music data received from the network card 125 and the PCM compressed music data encoded by the encode card 126.

In this example, since music data is transferred to the medium LAN 102 that is an Ethernet LAN, PCM non-compressed music data is not encoded on real time basis. PCM non-compressed music data that is supplied from the server 113 is stored to the hard disk 127. At a proper timing, the PCM non-compressed music data is supplied to the encode card 126. As a result, the PCM non-compressed music data is encoded by the encode card 126. Thereafter, the PCM compressed music data that has been encoded is stored to the hard disk 127. Since the hard disk 127 is used as a temporary buffer, PCM non-compressed music data is properly encoded.

An interface 128 is disposed among the network card 124, the network card 125, the encode card 126, the hard disk 127, and the CPU 121. The interface 128 executes an interfacing process.

The CPU 121, the ROM 122, the RAM 123, and the interface 128 are disposed on one mother board 120.

Figure 4:
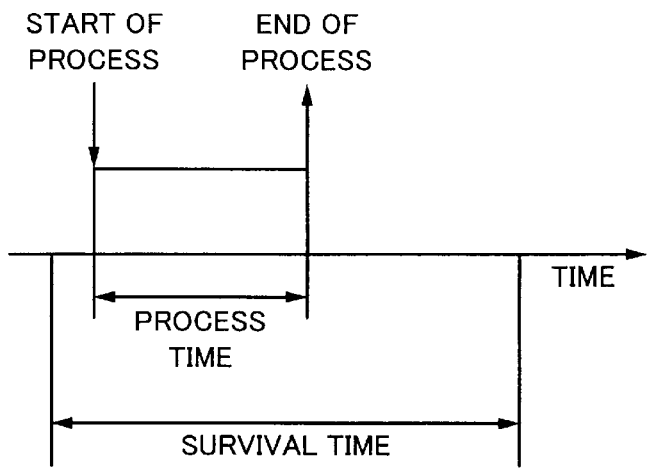
FIG. 4 is a schematic diagram for explaining a survival time.

The music delivery service system is controlled by a real time OS (Operating System). The real time OS is a multitask OS that simultaneously operates a plurality of tasks (processes). By a non-multitask OS, while a particular process is being executed, even if another event (namely, an external request) takes place, the event handler for the external request may not immediately get started. In contrast, by the real time OS, it is assured that in a predetermined time period, a relevant event handler gets started. In other words, as shown in FIG. 4, a process that is started in predetermined time corresponding to a clock (the predetermined time is referred to as survival time) is completed in the survival time.

Figure 5:
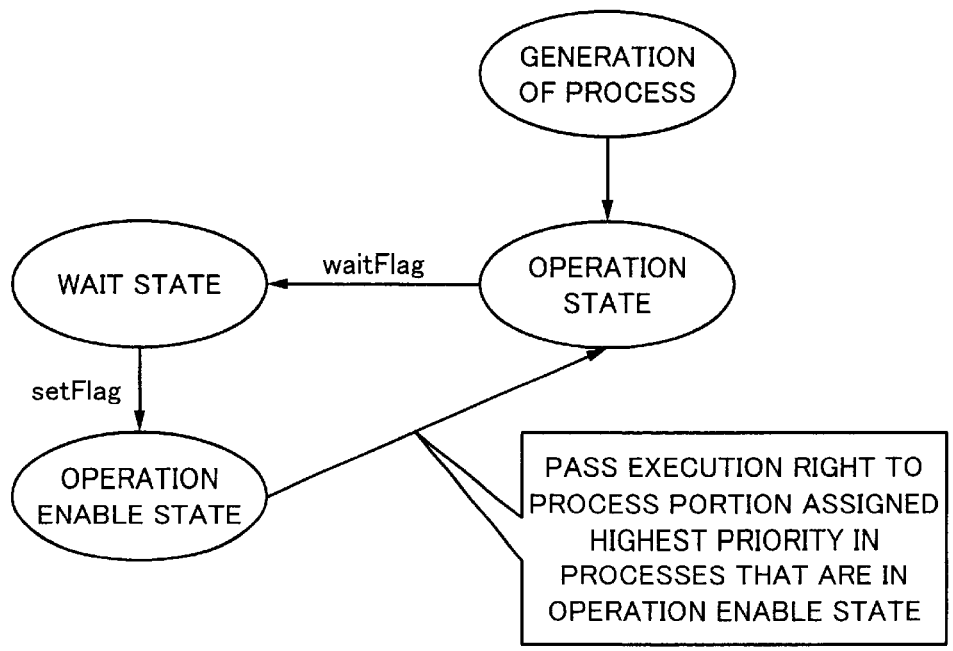
FIG. 5 is a schematic diagram for explaining the theory of a real time OS.

FIG. 5 schematically shows the basic concept of the real time OS. When each process portion is generated, it is managed so that it successively advances to one of three states that are operation state, wait state, and operation enable state. Each process portion is managed with a flag. When each process portion advances from the operation state to the wait state, a command waitFlag that causes the process portion to wait for a flag is generated. When each process portion advances form the wait state to the operation enable state, a command setFlag that sets a value to a flag is generated.

A plurality of process portions can take place at the same time. Priority is assigned to each of the plurality of process portions. The real time OS passes an execution right to a process portion assigned the highest priority in process portions that are in the operation enable state.

When an event takes place, the real time OS can quickly the current process portion to another process portion assigned the highest priority in process portions that are in the operation state.

FIG. 6 shows an example of the functional structure of the encoder 112 (namely, an example of the structure of an encoding process program). The encoding process program is composed of three process portions (each of which has an executable program and a data area necessary for executing the program) and three capsules (elements denoted by dual line boxes). The three processes are a capsule manager 151, an encoding process controlling application 152, and a main application 153. The three capsules are a control data input—output capsule 154, a music data input—output capsule 155, and an encoding process capsule 156. Each capsule is composed of a plurality of process portions that are formed as a block (capsulated). In FIG. 6, an element denoted by a solid line box is a process portion.

The capsule manager 151 controls the encoding process controlling application 152, the control data input—output capsule 154, the music data input—output capsule 155, and the encoding process capsule 156 through the main application 153.

The encoding process controlling application 152 communicates with the main application 153, receives a command from for example the capsule manager 151, and controls the control data input—output capsule 154 corresponding to the command. The main application 153 directly communicates with the capsule manager 151 and controls the music data input—output capsule 155 and the encoding process capsule 156 corresponding to a command received from the capsule manager 151.

The control data input—output capsule 154 is managed by an encoding process controlling manger 161. The encoding process controlling manger 161 generates and erases a network card input I/F process portion 162 (hereinafter referred to as network card input I/F, this applied to other process portions), a network card output I/F 163, and a network card driver (process portion) 164 corresponding to a command received from the encoding process controlling application 152.

The network card input I/F 162 receives control data (command) from the control process portion of the terminal unit 111 through the network card 124 and the network card driver 164 and outputs the control data to the encoding process controlling manger 161. The network card output I/F 163 receives control data (message) from the main application 153 through the encoding process controlling application 152 and the encoding process controlling manger 161 and outputs the control data to the network card driver 164.

The network card driver 164 executes an input—output interfacing process for the network card 124, receives control data (command) transferred on the alarm LAN 101, and outputs the control data to the network card input I/F 162. In addition, the network card driver 164 receives control data (message) from the network card output I/F 163 and outputs the control data to the network card 124.

The music data input—output capsule 155 is managed by a data input—output manager 171. The data input—output manager 171 generates and deletes a network card input—output I/F 172 (process portion) and a network card driver 173 (process portion) corresponding to a command received from the main application 153.

The network card input—output I/F 172 receives PCM non-compressed music data from the server 113 through the network card 125 and the network card driver 173 and outputs the PCM non-compressed music data to the data input—output manager 171. In addition, the network card input—output I/F 172 receives PCM compressed music data from the data input—output manager 171 and outputs the PCM compressed music data to the network card driver 173.

The network card driver 173 executes an input—output interfacing process for the network card 125, receives PCM non-compressed music data transferred on the medium LAN 102, and outputs the PCM non-compressed music data to the network card input—output I/F 172. In addition, the network card driver 173 receives PCM compressed music data from the network card input—output I/F 172 and outputs the PCM compressed music data to the network card 125.

The encoding process capsule 156 is managed by an encoding process manager 181. The encoding process manager 181 generates and deletes an encode engine input—output I/F 182, an encode engine input—output I/F 183, an encode engine 184, an encode card input—output I/F 185, an encode card input—output I/F 186, and an encode card driver 187 (all are process portions). In addition, the encoding process manager 181 performs an encoding process type determining process for determining whether the encoding process is performed by software (encode engine 184) or hardware (encode card 126). In addition, the encoding process manager 181 performs an encoding process type determining process for determining whether the encoding process is performed corresponding to the ATRAC 1 based encoding process or the MPEG 1 based encoding process.

The encode engine input—output I/F 182 receives PCM non-compressed music data that is encoded corresponding to the ATRAC 1 based encoding process from the encoding process manager 181 and outputs the PCM non-compressed music data to the encode engine 184. In addition, the encode engine input—output I/F 182 receives PCM compressed music data that has been encoded corresponding to the ATRAC 1 based encoding process from the encode engine 184 and outputs the PCM compressed music data to the encoding process manager 181.

The encode engine input—output I/F 183 receives PCM non-compressed music data that is encoded corresponding to the MPEG 1 based encoding process from the encoding process manager 181 and outputs the PCM non-compressed music data to the encode engine 184. In addition, the encode engine input—output I/F 183 receives PCM compressed music data that has been encoded corresponding to the MPEG 1 based encoding process from the encode engine 184 and outputs the PCM compressed music data to the encoding process manager 181.

The encode engine 184 executes the ATRAC 1 based encoding process by software or the MPEG 1 based encoding process by software corresponding to control data supplied from the encode engine input—output I/F 182 and the encode engine input—output I/F 183.

The encode card input—output I/F 185 receives PCM non-compressed music data that is encoded corresponding to the ATRAC 1 based encoding process from the encoding process manager 181 and outputs the PCM non-compressed music data to the encode card driver 187. In addition, the encode card input—output I/F 185 receives PCM compressed music data that has been encoded corresponding to the ATRAC 1 based encoding process from the encode card driver 187 and outputs the PCM compressed music data to the encoding process manager 181.

The encode card input—output I/F 186 receives PCM non-compressed music data that is encoded corresponding to the MPEG 1 based encoding process from the encoding process manager 181 and outputs the PCM non-compressed music data to the encode card driver 187. In addition, the encode card input—output I/F 186 receives PCM compressed music data that has been encoded corresponding to the MPEG 1 based encoding process from the encode card driver 187 and outputs the PCM compressed music data to the encoding process manager 181.

The encode card driver 187 executes an input—output interfacing process for the encode card 126, receives PCM non-compressed music data from the encode card input—output I/F 185 and the encode card input—output I/F 186, and outputs the PCM non-compressed music data to the encode card 126. In addition, the encode card driver 187 receives PCM compressed music data that has been encoded from the encode card 126, and outputs the PCM compressed music data to the encode card input—output I/F 185 and the encode card input—output I/F 186. When the encode card 126 as a hardware device performs the ATRAC 1 based encoding process, it is substituted with a device having a relevant function. When the encode card 126 performs the MPEG 1 based encoding process, it is substituted with a device having a relevant function.

Next, with reference to a flow chart shown in FIG. 7, the processes performed by the individual process portions in the case that the ATRAC 1 based encoding process is performed will be described.

When the power of the encoder 112 is turned on, the real time OS generates the capsule manager 151. The capsule manager 151 causes the main application 153 to generate the music data input—output capsule 155 and the encoding process capsule 156. In addition, the capsule manager 151 causes the encoding process controlling application 152 to generate the control data input—output capsule 154.

When the control process portion W of the terminal unit 111 sends a command for the ATRAC 1 based encoding process to the network card 124 of the encoder 112 through the alarm LAN 101, the command is supplied from the network card driver 164 of the control data input—output capsule 154 to the encoding process controlling manger 161 through the network card input I/F 162. When the encoding process controlling manger 161 receives the command, the encoding process controlling manger 161 requests the encoding process controlling application 152 to start the ATRAC 1 based encoding process at step SI.

The encoding process controlling application 152 receives the request message from the encoding process controlling manger 161 at step S11. The request message contains code information that represents an encoding process type and an a portion that executes the encoding process. In this example, the encoding process type is the ATRAC 1 based encoding process and the portion that executes the encoding process is a hardware device (encode card 126).

When the encoding process controlling application 152 receives the request message from the encoding process controlling manger 161, the encoding process controlling application 152 requests the main application 153 to permit the ATRAC 1 based encoding process at step S12.

When the main application 153 receives the request message from the encoding process controlling application 152 at step S31, the main application 153 determines whether or not the process corresponding to the request message can be executed. When the process cannot be executed, the main application 153 sends a reply message that represents that the process cannot be executed to the encoding process controlling application 152. When the encoding process controlling application 152 receives the reply message, the encoding process controlling application 152 sends the reply message to the encoding process controlling manger 161. The encoding process controlling manger 161 sends the reply message to the control process portion W of the terminal unit 111 through the encoding process controlling manger 161, the network card output I/F 163, the network card driver 164, and the network card 124.

In the example shown in FIG. 7, the main application 153 determines that the ATRAC 1 based encoding process can be executed and sends a relevant permission reply message to the encoding process controlling application 152 at step S32.

When the encoding process controlling application 152 receives the permission reply message from the main application 153 at step S13, the encoding process controlling application 152 outputs a reply message that represents the start of the ATRAC 1 based encoding process to the encoding process controlling manger 161 at step S14. The encoding process controlling manger 161 receives the reply message at step S2. In the above-described manner, the encoding process controlling manger 161 sends the reply message to the control process portion W.

The main application 153 outputs a permission reply message for the ATRAC 1 based encoding process to the encoding process controlling application 152 at step S32. Thereafter, the main application 153 requests the data input—output manager 171 of the music data input—output capsule 155 to acquire object data that is encoded (namely, outputs an object data acquisition request message). The object data acquisition request message contains the address of the object data in the storing portion, the data amount thereof, and so forth.

When the data input—output manager 171 receives the request message from the main application 153 at step S81, the data input—output manager 171 executes a process for acquiring the object data that is encoded from the designated address at step S82.

When the object data is stored in the hard disk 127, the data input—output manager 171 accesses the hard disk 127 through the network card input—output I/F 172, the network card driver 173, and the network card 125 and acquires PCM non-compressed music data for the designated amount from the designated address.

When the object data is recorded on a CD-R (not shown) or the like, the data input—output manager 171 accesses it and acquires the object data therefrom. When the object data is recorded in the server 113, the data input—output manager 171 accesses the server 113 through the alarm LAN 101 and receives the object data from the server 113 through the medium LAN 102. The acquired PCM non-compressed music data is temporarily stored to a buffer area of the RAM 123.

When the PCM non-compressed music data is acquired in such a manner, the data input—output manager 171 sends an object data acquisition completion reply message to the main application 153 at step S83.

When the main application 153 receives the object data acquisition completion reply message from the data input—output manager 171 at step S34, the main application 153 requests the encoding process manager 181 to start encoding the object data at step S35. This request message contains information that represents that the encoding process type is the ATRAC 1 based encoding process and the encoding process portion is the encode card 126.

When the encoding process manager 181 receives the encoding process start request message from the main application 153 at step S61, the encoding process manager 181 determines whether or not the process for the request message can be executed. When the process for the request message cannot be executed, the encoding process manager 181 outputs a reply message that represents that the process for the request message cannot be executed to the main application 153. In the example shown in FIG. 7, the encoding process manager 181 determines that the encoding process can be executed and outputs a reply message that represents that the encoding process can be executed to the main application 153 at step S62.

The main application 153 receives the encoding process start reply message from the encoding process manager 181 at step S36. Thus, the main application 153 knows that the encoding process manager 181 has accepted the process for the request message sent at step S35.

After the encoding process manager 181 outputs an encoding process start reply message to the main application 153 at step S62, the encoding process manager 181 causes the main application 153 to execute the encoding process at step S63. In reality, the encoding process manager 181 requests the encode card 126 to execute the ATRAC 1 based encoding process through the encode card input—output I/F 185 and the encode card driver 187 corresponding to the encoding process start request message received from the main application 153. This request message contains the address of a buffer of the RAM 123 for the PCM compressed music data. The encode card 126 reads the PCM non-compressed music data from the buffer area of the RAM 123 corresponding to the request message and executes the ATRAC 1 based encoding process. The encoded PCM compressed music data is recorded to the RAM 123.

After the encode card 126 has completed the encoding process, the encoding process manager 181 sends an encoding process completion message that represents the encoding process has been completed to the main application 153 at step S64.

When the main application 153 receives the encoding process completion message from the encoding process manager 181 at step S37, the main application 153 sends a encoding process completion reply message to the encoding process manager 181 at step S38.

The encoding process manager 181 receives the encoding process completion reply message from the main application 153 at step S65. Thus, the encoding process manager 181 acknowledges that the encoding process completion message has been sent to the main application 153.

After the main application 153 outputs the encoding process completion reply message to the encoding process manager 181 at step S38, the main application 153 outputs a generated data storing request message for PCM compressed music data that has been encoded and generated to the data input—output manager 171. This request message contains the address of a medium that stored the data. When the PCM compressed music data that has been encoded is stored to the hard disk 127, the request message contains the address of the hard disk 127.

When the data input—output manager 171 receives the generated data storing request message from the main application 153 at step S84, the data input—output manager 171 executes a process for storing the received data corresponding to the request message at step S85. In reality, when the request message represents that the generated data should be stored to the hard disk 127, the data input—output manager 171 accesses the hard disk 127 through the network card input—output I/F 172, the network card driver 173, and the network card 125 and records the PCM compressed music data that has been encoded to the designated address of the hard disk 127.

When the request message represents that the generated data should be stored to a CD-R, the PCM compressed music data that has been encoded is stored to the designated address of the CD-R. When the request message represents that the generated data should be stored to the server 113, the PCM compressed music data that has been encoded is supplied and stored to the server 113 through the medium LAN 102.

After the PCM compressed music data has been stored in the above-described manner, the data input—output manager 171 outputs a generated data storage completion reply message that represents that the data has been stored to the main application 153 at step S86.

When the main application 153 receives the generated data storage completion reply message from the data input—output manager 171 at step S40, the main application 153 outputs a completion message that represents that the ATRAC 1 based encoding process has been completed to the encoding process controlling application 152 at step S41.

When the encoding process controlling application 152 receives the message from the main application 153 at step S15, the encoding process controlling application 152 sends a message that represents that the ATRAC 1 based encoding process has been completed to the encoding process controlling manger 161 at step S16.

When the encoding process controlling manger 161 receives the completion message from the encoding process controlling application 152 at step S3, the encoding process controlling manger 161 outputs a reply message corresponding to the completion message to the encoding process controlling application 152 at step S4.

When the encoding process controlling application 152 receives the reply message from the encoding process controlling manger 161 at step S17, the encoding process controlling application 152 sends an ATRAC 1 based encoding process completion replay message to the main application 153 at step S18.

The main application 153 receives the completion reply message from the encoding process controlling application 152 at step S42.

Figure 8B:
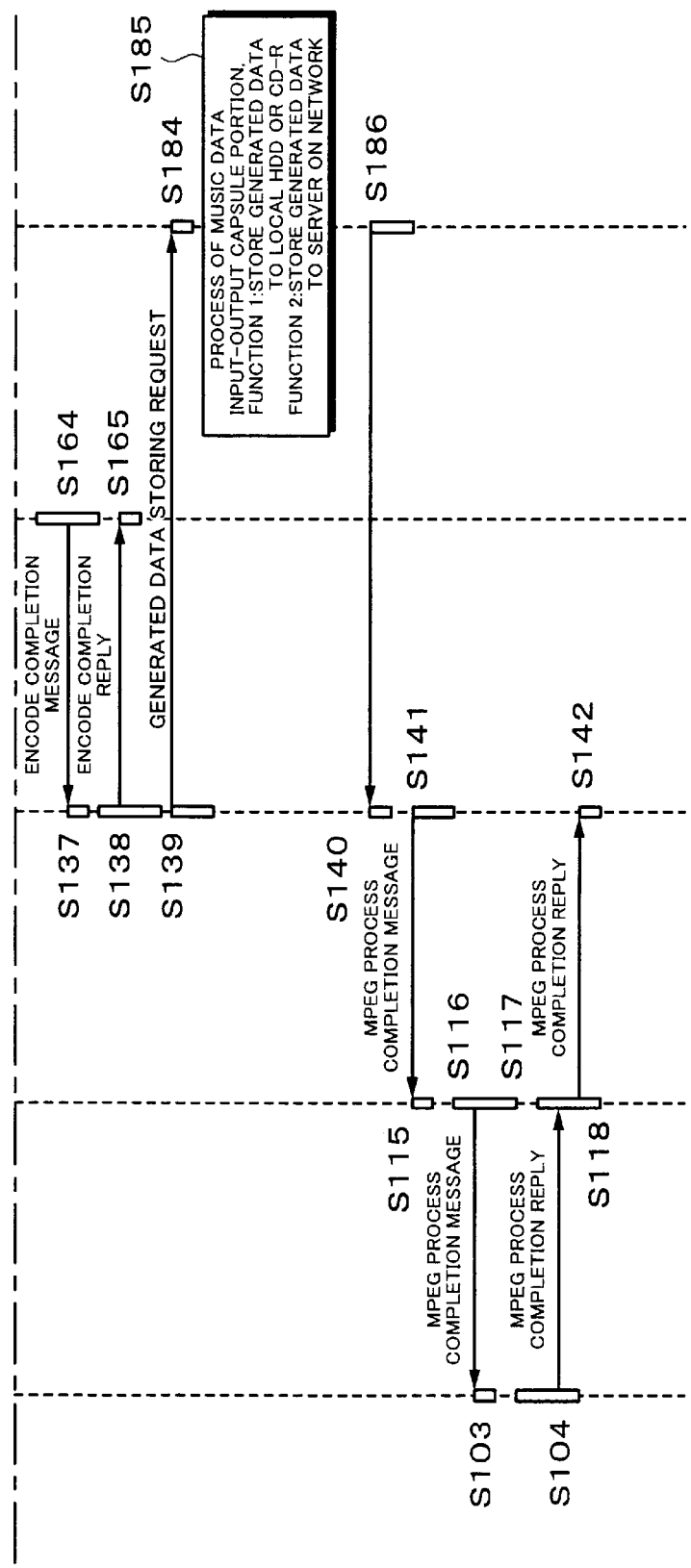

FIG. 8 shows the MPEG 1 based encoding process. Steps S101 to S142 shown in FIG. 8 are basically the same as steps SI to S42 of the ATRAC 1 based encoding process shown in FIG. 7. However, in FIG. 8, the encoding process type is the MPEG 1 based encoding process rather than the ATRAC 1 based encoding process. Thus, in the object data acquisition process at step S182 shown in FIG. 8 corresponding to step S82 shown in FIG. 7, the data sending amount and the data sending timing in the format corresponding to the ATRAC 1 based encoding process are changed to those corresponding to the MPEG 1 based encoding process.

In addition, in the process at step S163 shown in FIG. 8 corresponding to the process at step S63 of the ATRAC 1 based encoding process shown in FIG. 7, the MPEG 1 based encoding process is executed rather than the ATRAC 1 based encoding process. Of course, since the ATRAC 1 based encoding process is different from the MPEG 1 based encoding process, for example, different encoding data unit, different sending timing, and different error correction code are used.

This applies to the process at step S185 shown in FIG. 8 corresponding to the process at step S85 shown in FIG. 7.

However, all processes required due to the different encoding method are executed by each process portion such as the capsule manager 151 of the encoding process capsule 156 and each process portion such as the data input—output manager 171 of the music data input—output capsule 155. Thus, the main application 153, the encoding process controlling application 152, and so forth do not need to precisely recognize the differences between the ATRAC 1 based encoding process and the MPEG 1 based encoding process.

In other words, from the view point of the main application 153, the details of the data acquiring process and the data storing process executed by the data input—output manager 171 of the music data input—output capsule 155 and the encoding process executed by the encoding process manager 181 of the encoding process capsule 156 are concealed.

For example, when the data input—output manager 171 acquires data from the hard disk 127, the data input—output manager 171 uses ATA (AD (Advanced Technology) Attachment) command. However, when the data input—output manager 171 acquires data from the server 113 on the network, the data input—output manager 171 uses FTP (File Transfer Protocol) of TCP/IP (Transmission Control Protocol/Internet Protocol) or HTTP (Hyper Text Transport Protocol).

When the data input—output manager 171 acquires data from a CD-R, the data input—output manager 171 uses the SCSI (Small Computer System Interface) interface. When the data input—output manager 171 acquires data from a CD-R, the data input—output manager 171 uses the ATAPI (AT Attachment Packet Interface).

When the ATRAC type encoding process is performed at high speed, the process is performed through the ATRAC encoder driver of the encode card driver 187. When the MPEG format encoding process is performed at high speed, the process is performed through the MPEG encoder driver of the encode card driver 187.

The encoding process capsule 156 performs processes using various hardware driver protocols. However, the main application 153 requires only three simple sequences that are a data acquisition request, an encoding process start request, and a data storing request.

Thus, the encoding process capsule 156 and the music data input—output capsule 155 conceal these protocols and data acquiring method against the main application 153.

As a result, the main application 153 and the encoding process controlling application 152 need to only determine what encoding process type is used and whether the encoding process is executed by software or hardware. Thus, even if the encoding process type is changed or extended, it is not necessary to change the main application 153 and the encoding process controlling application 152. If necessary, their changes are small.

The program for the encoding process of the encoder 112 is structured as described above. The process portions (elements denoted by sold line boxes) shown in FIG. 6 change their states corresponding to a state transition chart shown in FIG. 9 and execute their processes.

Figure 9:
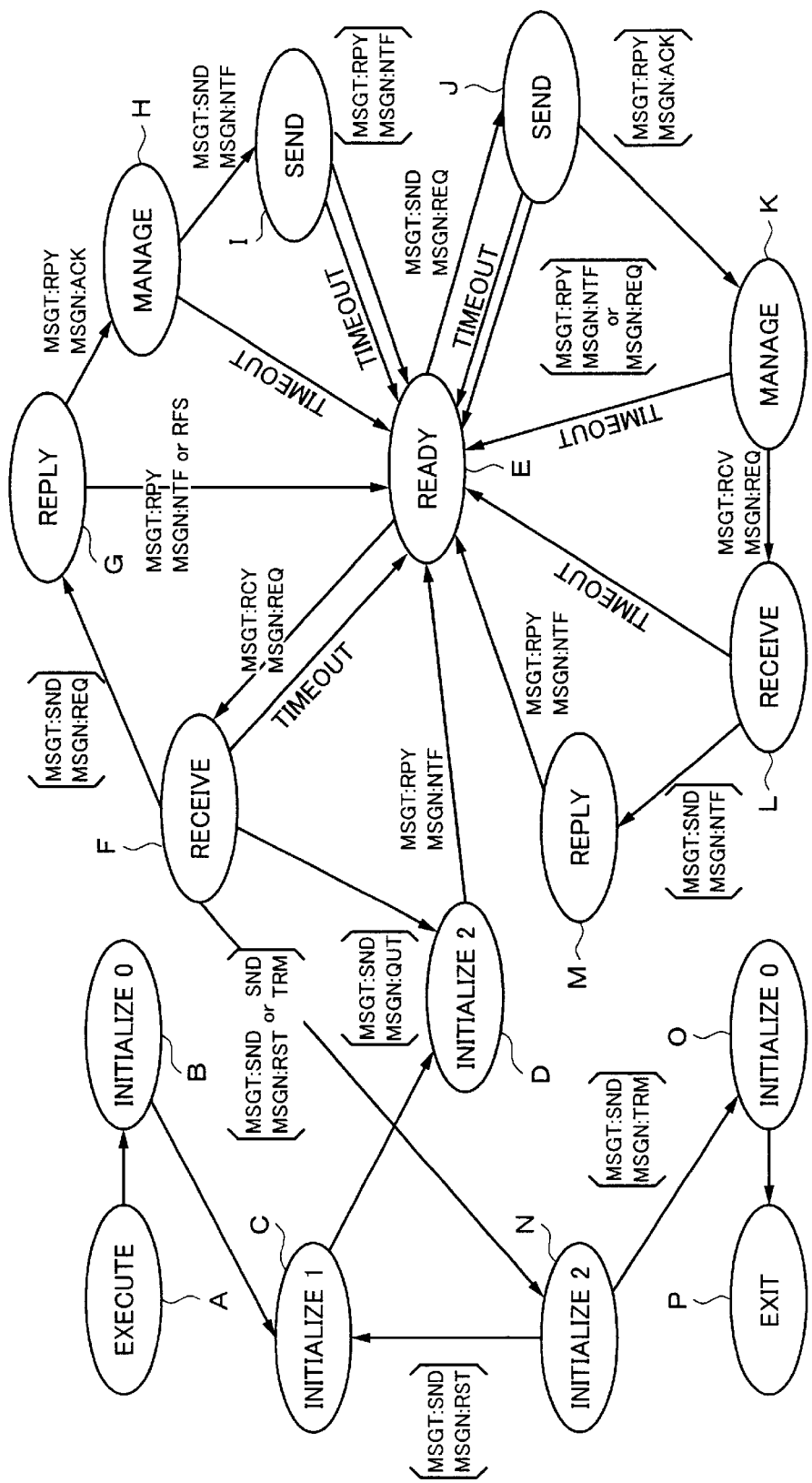
FIG. 9 is a schematic diagram for explaining a state transition of the process portions shown in FIG. 6.

The states shown in FIG. 9 compose the operation states shown in FIG. 5.

The state transition chart shown in FIG. 9 show 12 types of states that are execute (EXECUTE), initialize 0 (INITIALIZE 0), initialize 1 (INITIALIZE 1), initialize 2 (INITIALIZE 2), terminate 1 (TERMINATE 1), terminate 0 (TERMINATE 0), exit (EXIT), receive (RECEIVE), reply (REPLY), manage (MANAGE), send (SEND), and ready (READY).

Next, with reference to a flow chart shown FIG. 10, the state transition in the case that each process portion is normal will be described.

When the power of the terminal unit is turned on, the real time OS gets started and generates a process portion. The process portion advances to the execute state (EXECUTE) A at step S201.

Thereafter, the process portion advances to the initialize 0 state (INITIALIZE 0) B at step S202. In the initialize 0 state (INITIALIZE 0) B, the capsule (module) registering process is executed. In reality, a first buffer used to exchange data with the hardware device is allocated. Thereafter, the first buffer is initialized (for example 0s are written to the first buffer). Thereafter, the device is opened. Next, it is determined whether or not the device is normal. This process is performed once time when the power of the terminal unit is turned on.

The process portion advances from the initialize 0 state (INITIALIZE 0) B to the initialize 1 state (INITIALIZE 1) C at step S203. In initialize 1 state (INITIALIZE 1) C, the capsule resource allocating process is executed. Thus, a second buffer used to exchange data with the main application 153 is allocated. Thereafter, the second buffer is initialized. Next, a register is initialized.

The process portion advances from the initialize 1 state (INITIALIZE 1) C to the initialize 2 state (INITIALIZE 2) D at step S204. In the initialize 2 state (INITIALIZE 2) D, an initializing process for the capsules including the device is executed. When the initializing process is executed, the first buffer is initialized again (at that point, the allocating process is not performed).

Thereafter, the process portion advances from the initialize 2 state (INITIALIZE 2) D to the ready state (READY) E at step S205.

Each process portion advances to one of the states E, F, G, H, I, J, K, L, and M shown in FIG. 9 at step S205. In other words, each process portion determines whether or not a process request message for a completion request has been received at step S206. When a process request message other than the completion request has been received, the flow returns to step S205. At step S205, each process portion advances to a relevant state.

When the process portion is in one of the states E to M, if the determined result at step S206 represents that a process request message of a completion request has been received, the flow advances to step S207. The process portion advances to the terminate 1 state (TERMINATE 1) N at step S207. In the terminate 1 state N, an unallocating process for the second buffer is performed. Thereafter, the flow advances to step S208. The process portion advances to the terminate 0 state (TERMINATE 0) O at step S208. In the terminate 0 state (TERMINATE 0) O, the first buffer is unallocated. In addition, the device is closed.

Thereafter, the flow advances to step S209. The process portion advances to the exit state (EXIT) P at step S209. In the exit state P, the real time OS is stopped and the power of the terminal unit is turned off.

Each process portion exchanges an inter process portion communication message with other process portions. In a particular state, each process portion advances to another state denoted by an arrow mark shown in FIG. 9.

FIG. 11 shows the format of an inter process portion communication message. As shown in FIG. 11A, an inter process portion communication message is composed of a header and an extended portion. Data is written to the header and the extended portion of the inter process portion communication message corresponding to the FTP (File Transfer Protocol) format. As shown in FIG. 11C, "unsigned short type;" of the header contains message type (denoted by MSGT (Message Type), function type (denoted by FNCT (Function Type)), message number (denoted by MSGN (Message number)), and function number (denoted by FNCN (Function Number)).

MSGT contains data of one of 00 to 11 assigned corresponding to a requested process of interrupt, send, receive, or reply.

| <Process> | <Data> |
| --- | --- |
| Interrupt (INT (INTERRUPT)) | 00B |
| Send (SND (SEND)) | 01B |
| Receive (RCV (RECEIVE)) | 10B |
| Reply (RPY (REPLY)) | 11B |

MSGN contains one of data assigned corresponding to a requested process.

| <Process> | <Data> |
| --- | --- |
| Quit (QUT (QUIT)) | 001B |
| Reset (RST (RESET)) | 010B |
| Terminate (TRM (TERMINATE)) | 011B |
| Request (REQ (REQUEST)) | 100B |
| Notify (NTF (NOTIFY)) | 101B |
| Refuse (RFS (REFUSE)) | 110B |
| Acknowledgement (ACK (ACKNOWLEDGE)) | 111B |

FNCT and FNCN contain data corresponding to a requested process.

| <FNCT> | <FNCN> |
| --- | --- |
| Encode | ATRAC 1 based encoding process |
|  | MPEG 1 based encoding process |
| File transfer | put |
|  | get |

"pid_t src_pid" of the header contains the ID of the source process portion of an inter process portion communication message. "pid_t dst_pid" of the header contains the ID of the destination process portion of an inter process portion communication message.

The extended portion of an inter process portion communication message contains data of the stored location of encoded PCM non-compressed music data (for example, a memory address of the hard disk 127) and data of the stored location of encoded PCM compressed music data.

An inter process portion communication message shown in FIG. 12 is composed of only the header of the inter process portion communication message shown in FIG. 11.

Next, the state transition from the state E to the state M shown in FIG. 9 at steps S205 and S206 shown in FIG. 10 will be described. In this example, the case that the main application 153 requests the encoding process manager 181 to perform the ATRAC 1 based encoding process corresponding to a request message received from the terminal unit 111 (control process portion W) will be described.

Figure 13:
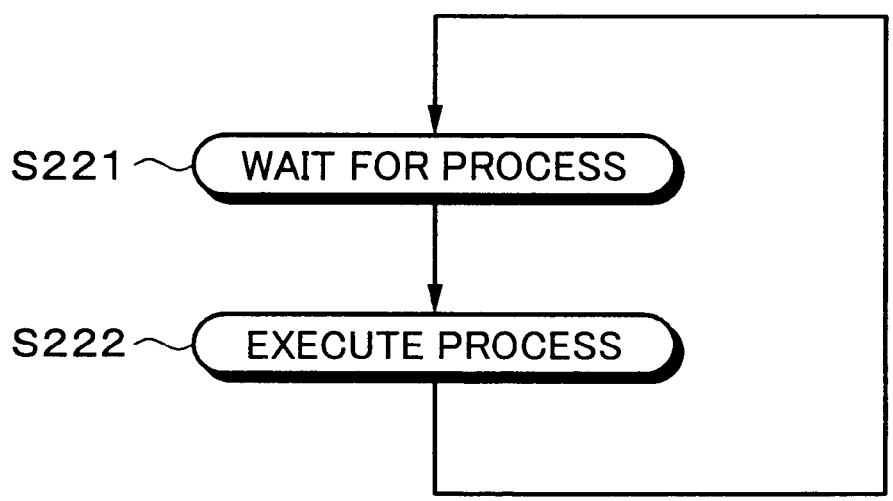
FIG. 13 is a flow chart for explaining a process of a process portion.

Each process is programmed as shown in FIG. 13. In FIG. 13, each process portion starts from a process waiting state at step S221. Thereafter, the flow advances to step S222. The process portion executes a predetermined process at step S222. When the process portion completes the process, the flow returns to step S221. Thus, the state transition of each process portion is pre-defined. In other words, the direction of the state transition is not defined in each state. Thus, the states of each process portion advance corresponding to routes represented by arrow marks shown in FIG. 9.

First of all, the state transition of the main application 153 will be described with reference to a flow chart shown in FIG. 14. It is assumed that the main application 153 has advanced to the ready state (READY) E at steps S201 to S205 shown in FIG. 10.

The main application 153 sends an inter process portion communication message having a header containing MSGT=SND, MSGN=REQ, FNCT=data representing encode, and FNCN=ATRAC 1 based encoding process (hereinafter, an inter process portion communication message having a header containing MSGT=SND and MSGN=REQ is denoted by (SND, REQ) message; this notation applies to other inter process portion communication messages) to the encoding process manager 181. Thereafter, the main application 153 advances from the ready state (READY) E to the send state (SEND) J.

The header of the (SND, REQ) message has "pid_t src_pid" containing the ID of the main application 153 as the source process portion and "pid_t dst_pid" containing the ID of the encoding process manager 181 as the destination process portion. In addition, the (SND, REQ) message has the extended portion as shown in FIG. 11. The extended portion contains the memory address of the hard disk 127 for encoded PCM non-compressed music data and the memory address of the hard disk 127 for encoded PCM compressed music data.

In FIG. 9, messages in brackets represent receive messages, whereas messages without brackets represent send messages.

At that point, the main application 153 starts up a built-in timer t.

Thereafter, the main application 153 waits until an inter process portion communication message having the header containing MSGT=RPY (this message is denoted by (RPY, XXX) message) corresponding to the (SND, REQ) message sent at step S311 is received from the encoding process manager 181. When the main application 153 has received the (RPY, XXX) message from the encoding process manager 181, the flow advances to step S313. The (RPY, XXX) message has a structure shown in FIG. 12. The (RPY, XXX) message has a structure shown in FIG. 12. In other words, the (RPY, XXX) message is composed of only a header.

The main application 153 determines whether or not the (RPY, XXX) message received at step S312 is a (RPY, ACK) message (containing MSGT=RPY and MSGN=ACK) at step S313. When the determined result at step S313 represents that the (RPY, XXX) message is a (RPY, ACK) message, the flow advances to step S314. As in this example, when the encoding process manager 181 receives a request message for the encoding process, if the encoding process can be performed, the encoding process manager 181 sends the (RPY, ACK) message to the main application 153.

The main application 153 advances from the send state (SEND) J to the manage state (MANAGE) K at step S314. In the manage state (MANAGE) K, the main application 153 executes a predetermined process. However, in this case, the main application 153 does not execute any process. In the manage state (MANAGE) K, each process portion can execute a predetermined process when necessary.

The main application 153 sends an encoding process completion waiting (RCV, REQ) message to the encoding process manager 181 at step S315. At that point, the main application 153 advances from the manage state (MANAGE) K to the receive state (RECEIVE) L. The main application 153 waits until a (SND, NTF) message (representing that the encoding process completion waiting message has been received) is received from the encoding process manager 181 at step S316. When the main application 153 receives the (SND, NTF) message, the flow advances to step S317.

The main application 153 advances from the receive state (RECEIVE) L to the reply state (REPLY) M at step S317. In the reply state (REPLY) M, the main application 153 sends a (RPY, NTF) message as a reply message of the (SND, NTF) message to the encoding process manager 181 at step S318. Thereafter, the flow advances to step S318. The main application 153 advances from the reply state (REPLY) M to the ready state (READY) E at step S318 and completes the process.

When the encoding process manager 181 receives a (SND, REQ) message as an encoding process request message from the main application 153, if the encoding process cannot be executed due to any reason, the encoding process manager 181 sends a (RPY, NTF) message that represents that the encoding process cannot be executed. In this case, the encoding process manager 181 determines that the received (RPY, XXX) message is not the (RPY, ACK) message at step S313. As a result, the flow advances to step S318, skipping steps S314 to S317. The main application 153 advances from the send state (SEND) J to the ready state (READY) E and completes the process.

In the send state (SEND) J, the manage state (MANAGE) K, and the receive state (RECEIVE) L, the main application 153 determines whether or not the measured time of the timer t that has been started at step S311 exceeds predetermined time. When the determined result represents that the measured time does not exceed the predetermined time, the main application 153 executes the above-described process. In contrast, when the determined result represents that the measured time of the timer t exceeds the predetermined time (namely, the timer t has timed out), the main application 153 advances to the ready state (READY) E and completes the process.

Next, the state transition of the encoding process manager 181 in such a case will be described with reference to a flow chart shown in FIG. 15. The encoding process manager 181 sends a (RCV, REQ) message that represents the encoding process manager 181 waits for an encoding process request to the main application 153 at step S321. The encoding process manager 181 advances from the ready state (READY) E to the receive state (RECEIVE) F. At that point, the encoding process manager 181 starts up the built-in timer t.

When the encoding process manager 181 receives a (SND, REQ) message as an encoding process request message from the main application 153 (this message is sent at step S311 shown in FIG. 14) at step S322, the encoding process manager 181 determines whether or not the requested encoding process can be executed at step S323. When the requested encoding process can be executed, the flow advances to step S324. The encoding process manager 181 advances from the receive state (RECEIVE) F to the reply state (REPLY) G at step S324.

The encoding process manager 181 sends a (RPY, ACK) message as an encoding process acceptance reply message corresponding to the (SND, REQ) message as an encoding process request message received from the main application 153 to the main application 153 at step S324. The encoding process manager 181 advances to the manage state (MANAGE) H at step S324.

The encoding process manager 181 controls the encode card 126 through the encode card input—output I/F 185 and the encode card driver 187 and executes the requested ATRAC 1 based encoding process in the manage state (MANAGE) H at step S325.

The capsule manager 151 decides the priority and the schedule algorithm of each capsule of the control data input—output capsule 154, the music data input—output capsule 155, and the encoding process capsule 156 and each process of each capsule.

When the encoding process for PCM non-compressed music data is started, higher priority is assigned to the encoding process capsule 156 than each of the control data input—output capsule 154 and the music data input—output capsule 155. When the ATRAC 1 based encoding process is executed, the highest priority is assigned to the encoding process manager 181 of the encoding process capsule 156. The next highest priority is assigned to the encode engine input—output I/F 182, the encode engine 184, the encode card input—output I/F 185, and the encode card driver 187. The lowest priority is assigned to each of the encode engine input—output I/F 183 and the encode card input—output I/F 186.

In other words, when the ATRAC 1 based encoding process is executed, higher priority is assigned to each of the encode engine input—output I/F 182 that interfaces with the encode engine 184 for the input and output of music data encoded corresponding to the ATRAC 1 based encoding process and the encode card input—output I/F 185 that interfaces with the encode card driver 187 for the input and output of music data encoded corresponding to the ATRAC 1 based encoding process than each of the encode engine input—output I/F 183 that interfaces with the encode engine 184 for the input and output of music data encoded corresponding to the MPEG 1 based encoding process and the encode card input—output I/F 186 that interfaces with the encode card driver 187 for the input and output of music data encoded corresponding to the MPEG 1 based encoding process.

In addition, even if the ATRAC 1 based encoding process is executed, when a command for an encoding process using hardware rather than software is issued, higher priority is assigned to the encode card input—output I/F 185 than the encode engine input—output I/F 182.

The capsule manager 151 supplies the priority of each capsule and each process portion decided in the above-described manner to each manager (the encoding process controlling manger 161, the data input—output manager 171, and the encoding process manager 181) of the control data input—output capsule 154, the music data input—output capsule 155, and the encoding process capsule 156 through the encoding process controlling application 152 and the main application 153. Each manager generates process portions corresponding to the priority of process portions and cause them to executes their processes.

For example, when the ATRAC 1 based encoding process is executed, the encoding process manager 181 of the encoding process capsule 156 generates the encode engine input—output I/F 182, the encode engine 184, the encode card input—output I/F 185, and the encode card driver 187 and supplies the inter process portion communication messages to them. The encode engine input—output I/F 182, the encode engine 184, the encode card input—output I/F 185, and the encode card driver 187 send and receive the supplied inter process portion communication messages to communicable process portions and execute the encoding process. Thus, in this example, PCM non-compressed music data is read from the address of the hard disk 127 corresponding to data contained in the extended portion of an inter process portion communication message. The PCM non-compressed music data is encoded corresponding to the ATRAC 1 based encoding process and stored to the address of the hard disk 127 corresponding to data contained in the extended portion of the inter process portion communication message.

Figure 15:
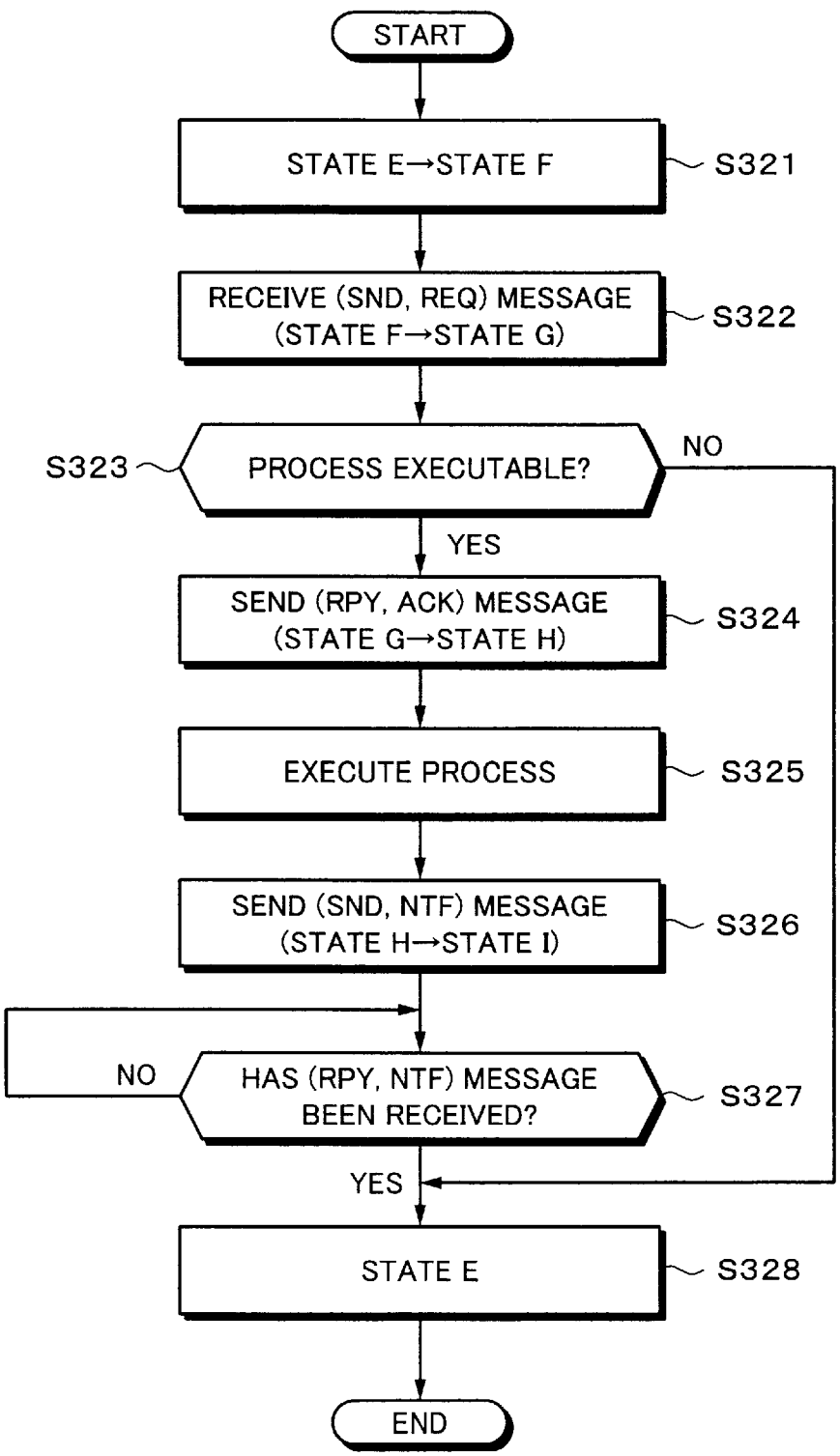
FIG. 15 a flow chart for explaining the operation of an encoding process manager shown in FIG. 6.

In the example of the process shown in FIG. 15, since the ATRAC 1 based encoding process is executed by hardware, the encode engine input—output I/F 182, the encode engine input—output I/F 183, the encode engine 184, and the encode card input—output I/F 186 are not generated. Thus, it is not necessary to allocate a resource for them. The resource can be used for other process portions.

Returning to FIG. 15, when the encoding process manager 181 completes the encoding process at step S325, the encoding process manager 181 advances from the manage state (MANAGE) H to the send state (SEND) I at step S326. In the send state (SEND) I, the encoding process manager 181 sends a (SND, NTF) message that represents that the encoding process has been completed to the main application 153.

Figure 14:
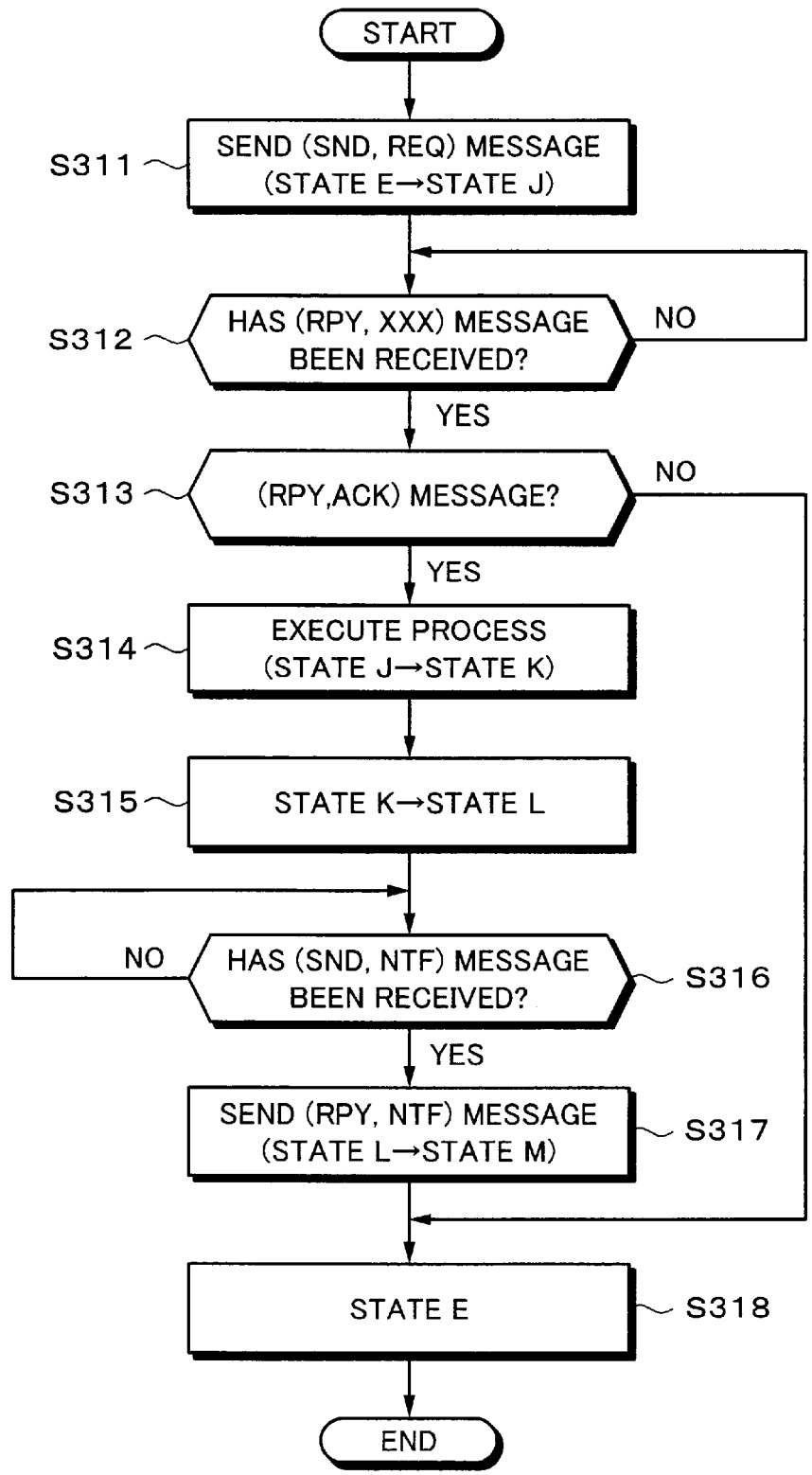
FIG. 14 is a flow chart for explaining the operation of a main application shown in FIG. 6.

The encoding process manager 181 waits until it receives a (RPY, NTF) message (that represents that the encoding process completion waiting message sent at step S317 shown in FIG. 14) has been received) from the main application 153 at step S327. When the encoding process manager 181 receives the (RPY, NTF) message, the flow advances to step S328. The encoding process manager 181 advances from the send state (SEND) I to the ready state (READY) E and completes the process at step S328.

In the manage state (MANAGE) H and the send state (SEND) I, the encoding process manager 181 determines whether or not the measured time of the timer t started at step S321 exceeds predetermined time. When the determined result represents that the measured time does not exceed the predetermined time, the encoding process manager 181 executes the process as described above. However, when the determined result represents that the measured time exceeds the predetermined time, the encoding process manager 181 advances to the ready state (READY) E and completes the process.

As was described above, the state of each process portion advances corresponding to the content of an inter process portion communication message. Thus, the main application 153 can cause the encoding process manager 181 to execute a predetermined encoding process with a message that represents the stored location of data that is encoded, the stored location of encoded PCM compressed music data or the encoding process type. In other words, the main application 153 does not need to control process portions other than the encoding process manager 181 of the encoding process capsule 156 (for example, the main application 153 does not need to control data process and buffer process) and control data transfer. Thus, even if the encode card 126 is substituted with another encode card that has a higher performance than that, when a relevant encoding process capsule 156 is provided along with the other encode card, it is not necessary to restructure the main application 153. Thus, the other encode card can be used (controlled) as it is.

That applies to the relation between the main application 153 and the music data input—output capsule 155 and the relation between the encoding process controlling application 152 and the control data input—output capsule 154.

In the above example, the encoder 112 executes the ATRAC 1 based encoding process and the MPEG 1 based encoding process. In addition, the encoder 112 can execute an encoding process in another format such as MP3, an effect function, and so forth.

For example, the encoder 112 may be an encoder in the format corresponding to the ATRAC3 (Adaptive Transform Acoustic Coding 3) (trademark), MPEG-2AAC (Advanced Audio Code) (trademark), ODesign Music Codec (trademark), TwinVQ (Transform-Domain Weighted Interleave Vector Quantization) (trademark), MS Audio (Microsoft Audio (WMA: Windows Media Audio) (trademark), Ogg Vorbis (trademark), or the like.

Figure 16:
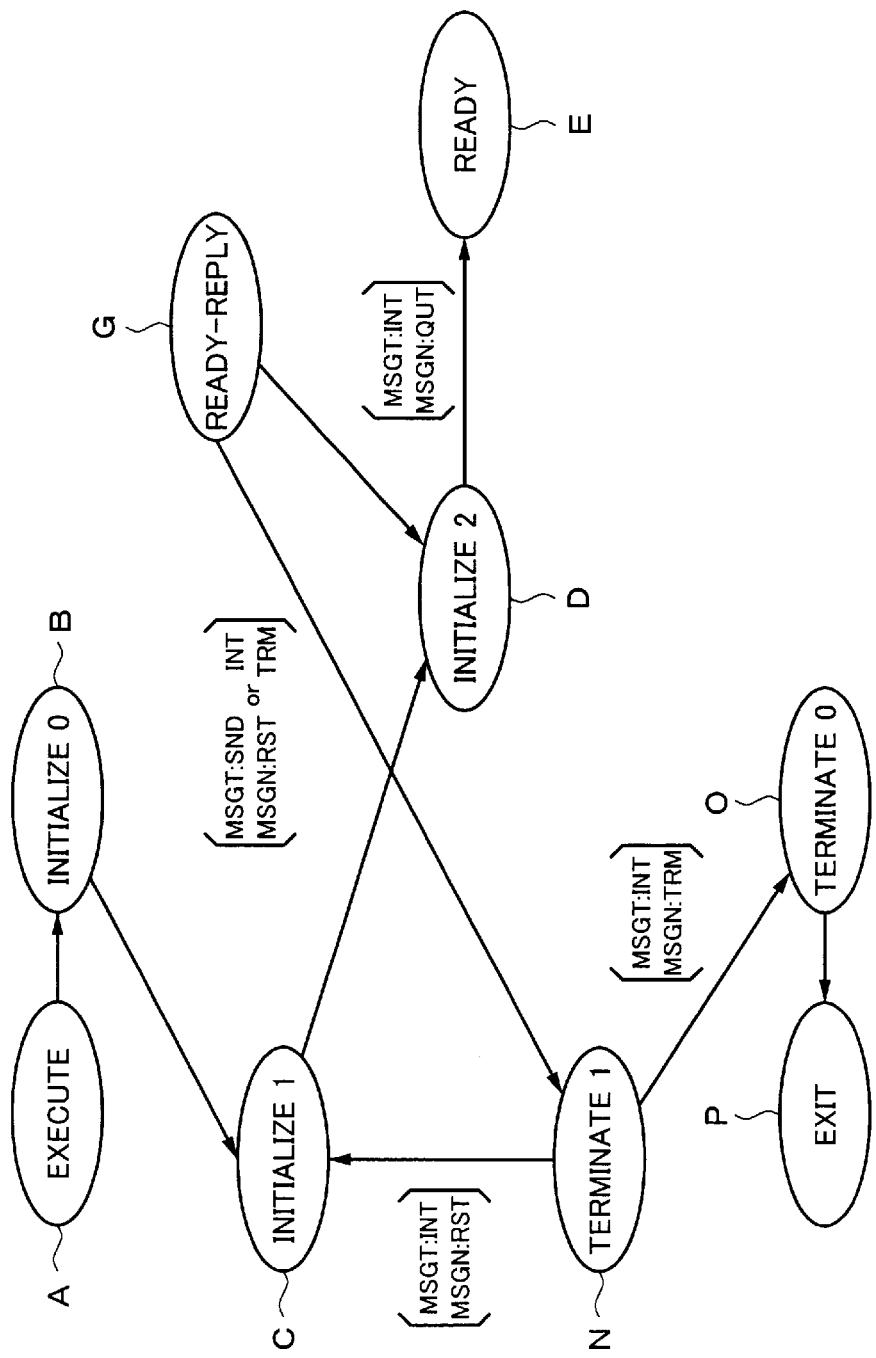
FIG. 16 is a schematic diagram for explaining a state transition of a process portion in the case that an initializing process is performed when an abnormality takes place.

Next, with reference to FIG. 16, an initializing process in the case that an abnormality takes place in each state will be described. State Q shown in FIG. 16 corresponds to the ready state (READY) E, the receive states (RECEIVE) F and L, the reply states (REPLY) G and M, the manage states (MANAGE) H and K, and the send states (SEND) I and J. In other words, there are three routes as initializing routes in the case that an interrupt (INTERRUPT) message is received in each of those states. The first route is the initialize 2 state (INITIALIZE 2) D and the ready state (READY) E. The second route is the terminate 1 state (TERMINATE 1) N, the initialize 1 state (INITIALIZE 1) C, the initialize 2 state (INITIALIZE 2) D, and the ready state (READY) E. The third route is the terminate 1 state (TERMINATE 1) N, the terminate 0 state (TERMINATE 0) 0, and the exit state (EXIT) P.

Figure 17:
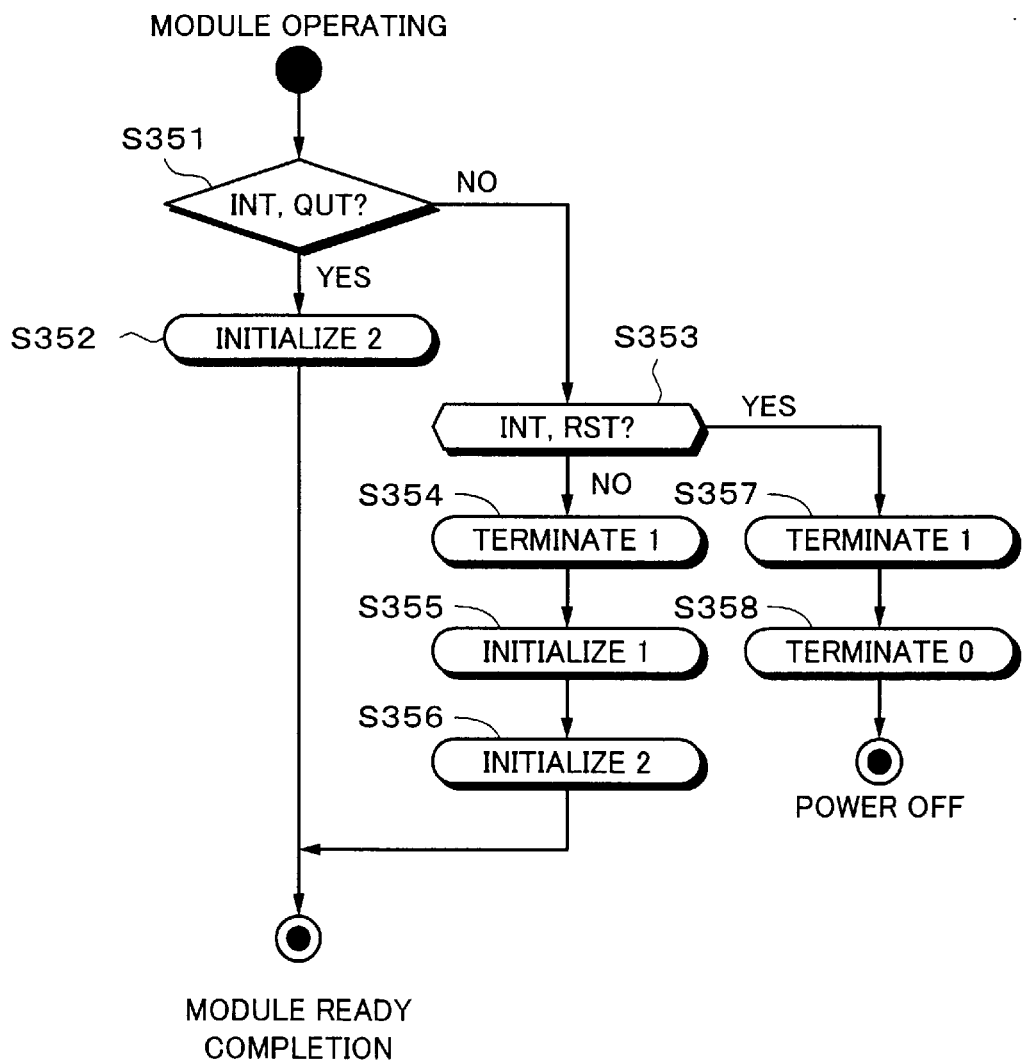
FIG. 17 is a flow chart for explaining an initializing process performed when an abnormality takes place.

FIG. 17 is a flow chart for explaining the initializing process in the case that an abnormality takes place. This process gets started when an interrupt message is received. Each process portion determines whether or not it has received a (INT, QUT) message as an interrupt message. When the determined result represents that the received interrupt message is a (INT, QUT) message, the flow advances to step S352. The process portion advances to the initialize 2 state (INITIALIZE 2) D at step S352. In the state, as in the case at step S204 shown in FIG. 10, an initializing process for the first buffer is performed. Thereafter, the process portion advances to the ready state (READY) E.

Thus, each process portion does not complete the process (not advance to the exit state (EXIT) P), but only initializes the first buffer and advances to the ready state (READY) E. Thus, an overhead for re-generating a process portion that has been completed is not required to perform an encoding process.

In addition, when an abnormality takes place due to any cause, it can be expected that by initializing the first buffer, the process can be restored from the abnormality. The first path of the process can be completed in shorter time than a second path of the process (that will be described later). Thus, the process can be more quickly restored from an abnormality.

When the determined result at step S351 represents that the interrupt message is not a (INT, QUT) message, the flow advances to step S353. The process portion determines whether or not the interrupt message is a (INT, RST) message at step S353. When the interrupt message is a (INT, RST) message, the flow advances to step S354. The process portion advances to the terminate 1 state (TERMINATE 1) N at step S354. In this state, the process portion performs an unallocating process for the second buffer. Next, the flow advances to step S355. The process portion advances to the initialize 1 state (INITIALIZE 1) C at step S355. In this state, as in the case at step S203 shown in FIG. 10, the process portion executes processes for allocating the second buffer, initializing it, and initializing a register.

Thereafter, the flow advances to step S356. The process portion advances to the initialize 2 state (INITIALIZE 2) D. In this state, as in the case at step S352, the process portion executes an initializing process for the first buffer.

Thereafter, the process portion advances to the ready state (READY) E.

Thus, in the second path of the initializing process, since the initializing process are performed in other states including the states of the first path of the initializing process, the second path of the initializing process takes longer time than the first path of the initializing process. However, the second path of the initializing process allows the process to be restored from an abnormality more accurately than the first path of the initializing process.

When the determined result at step S353 represents that the interrupt message is not a (INT, RST) message, the interrupt message is a (INT, TRM) message. Thus, in this case, the flow advances to step S357. The process portion advances to the terminate 1 state (TERMINATE 1) N at step S357. In the state, as in the case at step S354, the process portion performs an unallocating process for the second buffer. Thereafter, the flow advances to step S358. The process portion advances to the terminate 0 state (TERMINATE 0) O at step S358. In this state, the process portion performs an unallocating process for the first buffer and a process for closing the device.

Thereafter, the process portion advances to the exit state (EXIT) P. In this state, the real time OS stops. Thereafter, the power of the terminal unit is turned off.

The third path is performed when the process cannot be restored from an abnormality in the first path and the second path of the initializing process. In this case, the real time OS re-starts. A process for re-generating each process portion is performed. Thus, the third path of the initializing process takes longer time than the first path or the second path of the initializing process. However, the third path of the initializing process allows the process to be restored from an abnormality more accurately than the first path or the second path of the initializing process.

Figure 18:
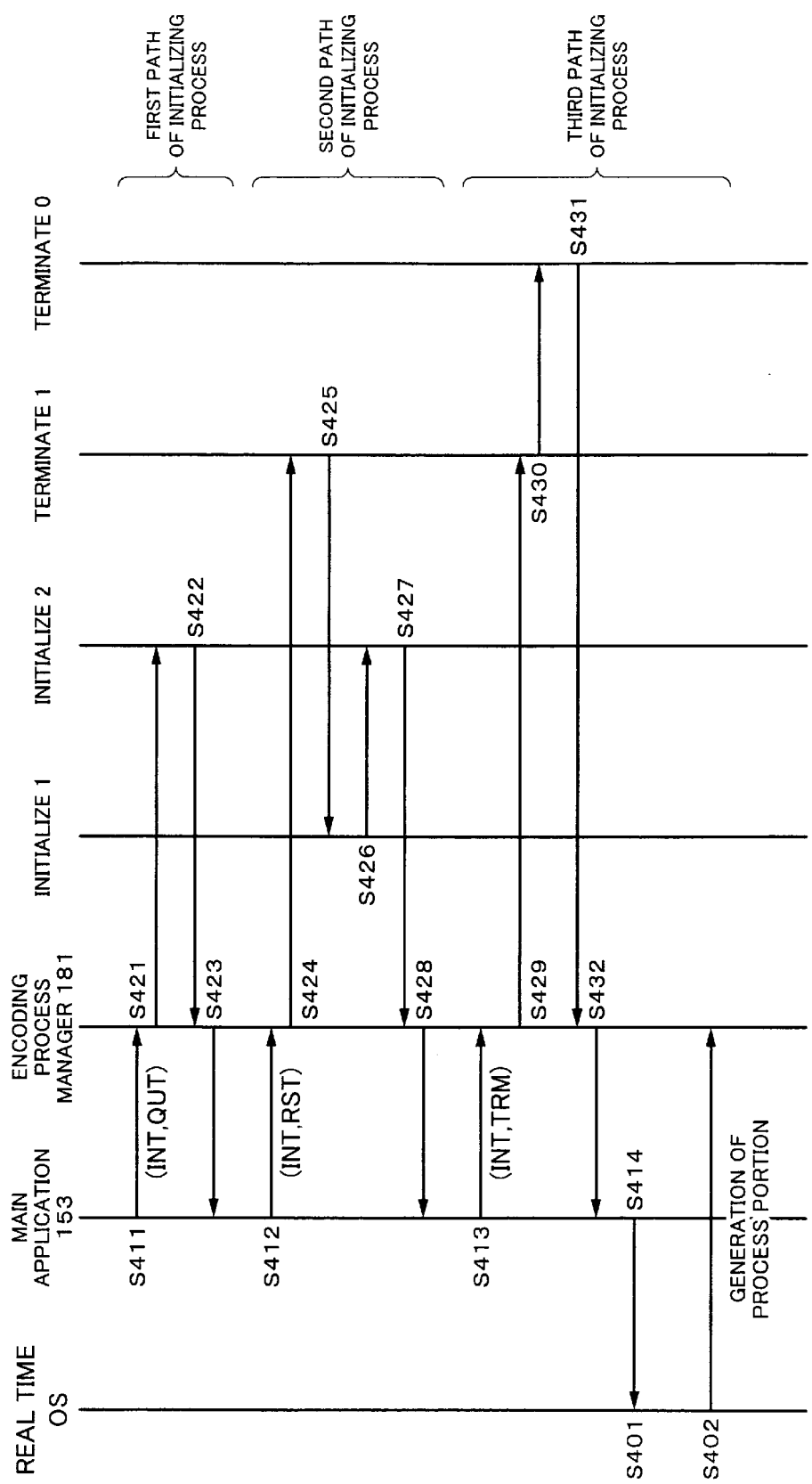
FIG. 18 is a flow chart for explaining an initializing process performed when an abnormality takes place.

FIG. 18 shows a time sequence of the first path, the second path, and the third path of the initializing process.

For example, when an abnormality takes place, the main application 153 outputs a (INT, QUT) message to the encoding process manager 181 at step S411. When the encoding process manager 181 receives the (INT, QUT) message, the encoding process manager 181 advances to the initialize 2 state (INITIALIZE 2) D at step S421. In the initialize 2 state (INITIALIZE 2) D, the encoding process manager 181 executes the initializing process for the first buffer. The encoding process manager 181 advances to the ready state (READY) E at step S422. The encoding process manager 181 notifies the main application 153 whether or not the process has been restored from an abnormality in the first path of the initializing process at step S423.

When the process has not been restored from an abnormality in the first path of the initializing process, the main application 153 outputs a (INT, RST) message to the encoding process manager 181 at step S412. When the encoding process manager 181 receives the (INT, RST) message from the main application 153, the encoding process manager 181 advances to the terminate 1 state (TERMINATE 1) N at step S423. The encoding process manager 181 performs an unallocating process for the second buffer at step S424. Thereafter, the encoding process manager 181 advances to the initialize 1 state (INITIALIZE 1) C at step S425. In the initialize 1 state (INITIALIZE 1) C, the encoding process manager 181 performs an allocating process for the second buffer, an initializing process for the second buffer, and an initializing process for a register.

The encoding process manager 181 advances to the initialize 2 state (INITIALIZE 2) D at step S426. In the initialize 2 state (INITIALIZE 2) D, the encoding process manager 181 executes an initializing process for the first buffer. The encoding process manager 181 returns to the ready state (READY) E at step S427. The encoding process manager 181 notifies the main application 153 whether or not the process has been restored from an abnormality in the second path of the initializing process at step S428.

When the determined result at step S428 represents that the process has not been restored from an abnormality in the second path of the initializing process, the main application 153 outputs a (INT, TRM) message to the encoding process manager 181 at step S413.

When the encoding process manager 181 receives the (INT, TRM) message from the main application 153, the encoding process manager 181 advances to the terminate 1 state (TERMINATE 1) N at step S429. In the terminate 1 state (TERMINATE 1) N, the encoding process manager 181 performs an unallocating process for the second buffer. The encoding process manager 181 advances to the terminate 0 state (TERMINATE 0) O at step S430. In the terminate 0 state (TERMINATE 0) O, the encoding process manager 181 performs an unallocating process for the first buffer and performs a process for closing the device.

The encoding process manager 181 advances to the ready state (READY) E at step S431. In the ready state (READY) E, the encoding process manager 181 notifies the main application 153 whether or not the process has been restored from an abnormality in the third path of the initializing process at step S432.

When the determined result represents that the process has not been restored from an abnormality in the third path of the initializing process, the main application 153 requests the real time OS to re-start at step S414.

The real time OS executes the re-start process corresponding to the request received from the main application 153 at step S401.

Thereafter, the real time OS executes a process for generating the encoding process manager 181 at step S402. Thus, at steps S201 to S205 shown in FIG. 10, the encoding process manager 181 advances to the ready state (READY) E through the execute state (EXECUTE) A, the initialize 0 state (INITIALIZE 0) B, the initialize 1 state (INITIALIZE 1) C, and the initialize 2 state (INITIALIZE 2) D.

Thus, since there are three paths of the initializing process that are successively performed in such a manner that the initializing process is quickly completed, the encoding process can be more quickly restored from an abnormality.

In each state other than the receive states (RECEIVE) F and L, the send states (SEND) I and J, a message cannot be received. Thus, in each of those states, even if an abnormality takes place and the process in the current state cannot be completed, the process may not be restored from the abnormality. In addition, in each of the receive states (RECEIVE) F and L and the send states (SEND) I and J, when an abnormality takes place, even if a predetermined message is received, the current state may not advance to another state. In such a situation, as was described above, in each state, an interrupt message can be accepted so that the current process can be restored from an abnormality.

As was described above, when the header of a inter process portion communication message contains MSGT=INT (INTERRUPT), as with a system call SIGNAL of the UNIX, an exception signal (asynchronous signal) causes each process portion to advance to the initialize 1 state (INITIALIZE) (initialize 1 states (INITIALIZE 1) C and D) and the terminate 1 state (TERMINATE) (terminate 1 states (TERMINATE 1) N and O). As a result, when environmental variables are pre-saved, the current process portion can securely return to the preceding state.

Figure 19:
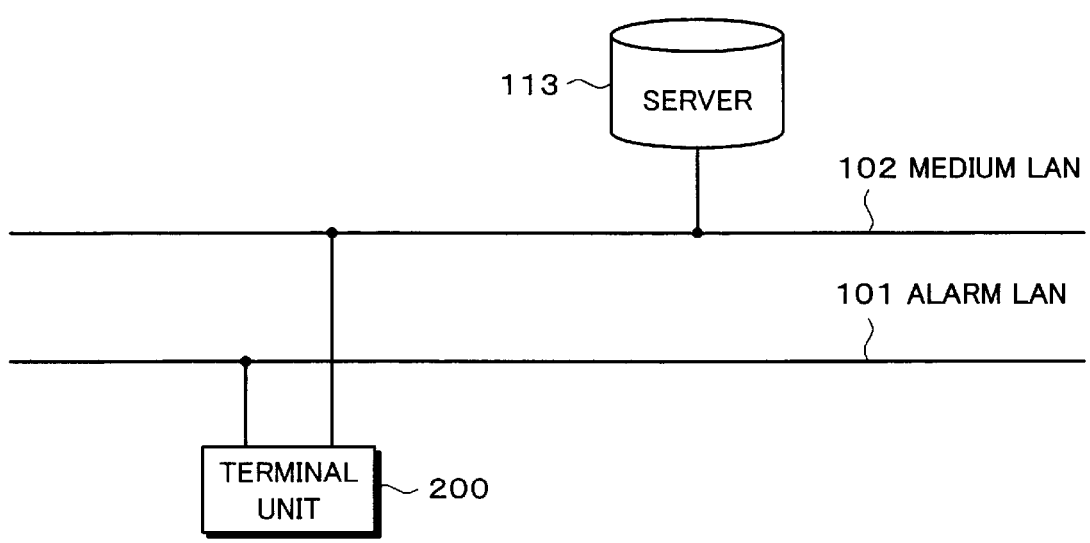
FIG. 19 is a schematic diagram showing an example of another structure of the music delivery service system according to the present invention.

FIG. 19 shows an example of another structure of the delivery side of the music delivery service system according to the present invention. For simplicity, in FIG. 19, similar portions to those in FIG. 2 are denoted by similar reference numerals and their description is omitted.

A terminal unit 200 is connected to an alarm LAN 101 and a medium LAN 102. The terminal unit 200 receives PCM non-compressed music data from a server 113. The terminal unit 200 encodes the received PCM non-compressed music data and supplies the encoded data to the server 113. In other words, the terminal unit 200 also has the function of the encoder 112 along with the function of the terminal unit 111 shown in FIG. 2.

Figure 20:
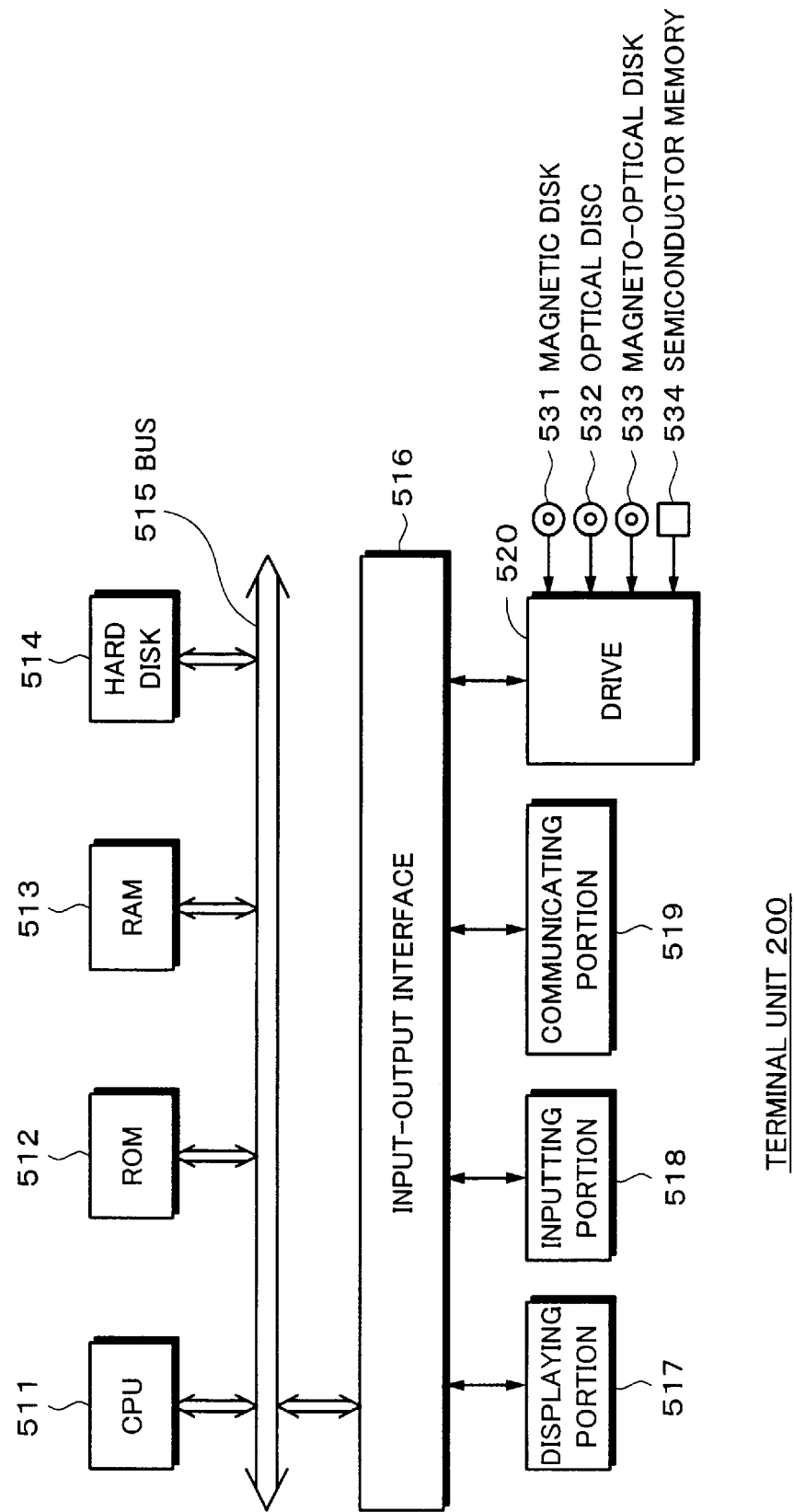
FIG. 20 is a block diagram showing an example of the structure of a terminal unit shown in FIG. 19.

FIG. 20 shows an example of the structure of the terminal unit 200. The terminal unit 200 is composed of for example a computer. An input—output interface 516 is connected to a CPU 511 through a bus 515. When the user inputs a command from an inputting portion 518 composed of a keyboard, a mouse, and so forth to the CPU 511, the CPU 511 loads a program stored in a ROM 512, a hard disk 514, or a record medium such as a magnetic disk 531, an optical disc 532, a magneto-optical disc 533, or a semiconductor memory 534 to a RAM 513 and executes the program with the RAM 513. In addition, when necessary, the CPU 511 outputs the processed result to a displaying portion 517 composed of for example an LCD through the input—output interface 516.

The program can be pre-stored to the hard disk 514 or the ROM 512. The program can be provided along with the terminal unit 200. In addition, the program can be provided as a package medium such as the magnetic disk 531, the optical disc 532, the magneto-optical disc 533, the semiconductor memory 534, or the like. Alternatively, the program can be provided from a satellite, a network, or the like to the hard disk 514 through a communicating portion 519.

It is preferred that the semiconductor memory 534 is a non-volatile memory such as a flash memory. In addition, it is preferred that the package medium that contains the semiconductor memory 534 that has a microcomputer and can authenticate the reading and writing operations to/from the semiconductor memory 534. The semiconductor memory 534 is for example memory stick (trademark), SD memory card (trademark), compact flash (trademark), smart media (trademark), multimedia card (trademark), micro drive (trademark), ID format (trademark), or thumb drive (trademark).

Figure 21:
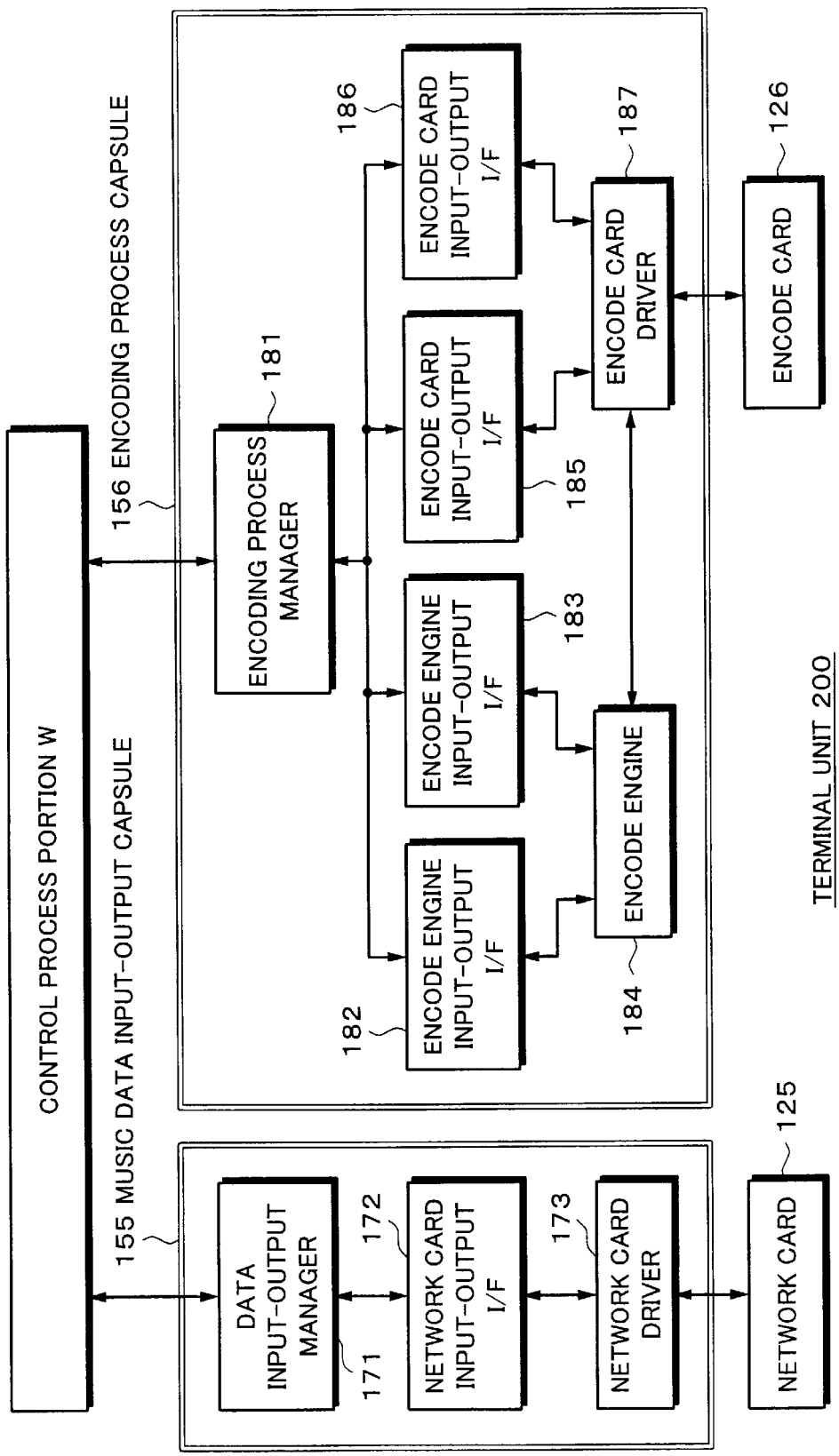
FIG. 21 is a block diagram showing an example of the functional structure of the terminal unit shown in FIG. 19.

FIG. 21 shows an example of the structure of the program that is loaded to the RAM 513 of the terminal unit 200 and executed by the CPU 511. The terminal unit 200 further comprises the control process portion W of the terminal unit 111 shown in FIG. 2 and the music data input—output capsule 155 and the encoding process capsule 156 of the encoder 112 shown in FIG. 6. In such a structure, the terminal unit 200 can execute the same encoding process as the terminal unit 111.

In this case, the process performed by the data input—output manager 171 against the control process portion W is capsulated as the music data input—output capsule 155. Likewise, the process executed by the encoding process manager 181 is capsulated as the encoding process capsule 156.

In this case, various processes including the initializing process in the case that an abnormality takes place are executed corresponding to the above-described state transition diagram. These processes are basically the same as those of the above-described case. Thus, their description is omitted.

In this specification, the steps that describe the program provided by a medium may be executed in the given sequential order. Alternatively, the steps may be executed in parallel or discretely.

Moreover, in this specification, the term "system" means an apparatus composed of a plurality of units and/or means.

INDUSTRIAL APPLICABILITY

The present invention is a record medium for recording a computer controllable program, the program being disposed between a controlling portion and hardware, the program controlling the hardware corresponding to a message received from the controlling portion, the program comprising a first process portion for communicating with the controlling portion, a second process portion for being communicable with first hardware and second hardware, a third process portion for communicating with the first process portion and the second process portion and executing an interfacing process corresponding to the first hardware, and a fourth process portion for communicating with the first process portion and the second process portion and executing an interfacing process corresponding to the second hardware, wherein the first process portion outputs a message to one of the third process portion and the fourth process portion corresponding to a message received from the controlling portion.

Thus, in any case, even if hardware is changed, it is not necessary to change the controlling portion. Even in the worst case, the change performed for the controlling portion is minor. One controlling portion can be used in common with many hardware devices.

The present invention is a storage medium for storing a computer controllable program, disposed between a controlling portion and hardware, for controlling the hardware corresponding to a message received from the controlling portion, the program containing capsulated process portions, wherein if an abnormality takes place in each process portion, it is initialized in one of a first path for initializing a first buffer for exchanging data with the hardware, a second path for unallocating a second buffer for exchanging data with the controlling portion, allocating the second buffer, initializing the second buffer, and initializing the first buffer, and a third path for unallocating the second buffer and unallocating the first buffer.

Thus, each process portion can be quickly restored from an abnormality.

What is claimed is:

1. A record medium for recording a computer controllable program, the program being disposed between a controlling portion and hardware, the program controlling the hardware corresponding to a message received from the controlling portion, the program comprising:

a first process portion for communicating with the controlling portion;

a second process portion for being communicable with first hardware and second hardware;

a third process portion for communicating with the first process portion and the second process portion and executing an interfacing process corresponding to the first hardware; and a fourth process portion for communicating with the first process portion and the second process portion and executing an interfacing process corresponding to the second hardware, wherein the first process portion outputs a message to one of the third process portion and the fourth process portion corresponding to a message received from the controlling portion.

2. The record medium as set forth in claim 1, wherein the program further comprises:

a fifth process portion for communicating with the controlling portion, and wherein the fifth process portion acquires data that is processed by the hardware corresponding to a message received from the controlling portion.

3. The record medium as set forth in claim 2, wherein the controlling portion includes a main application process portion.

4. The record medium as set forth in claim 3, wherein the fifth process portion of the program receives a message that designates the stored location of data from the main application process portion, wherein the fifth process portion acquires data that is processed by the hardware corresponding to the stored location of the data, wherein the first process portion receives a message that designates an encoding process type from the main application process portion, wherein one of the third process portion and the fourth process portion receives the message from the first process portion corresponding to the encoding process type, and wherein the first or second hardware that communicates with the second process portion encodes the acquired data corresponding to a communication result of one of the third process portion and the fourth process portion to the second process portion.

5. The record medium as set forth in claim 4, wherein the program further comprises:

a data input—output manager process portion for receiving a message that designates the stored location of data received from the main application process portion, the data input—output manager process portion acquiring data that is processed by the hardware corresponding to the stored location of the data;

an encoding process manager process portion for receiving the message that designates the encoding process type from the main application process portion; and a first encode card input—output I/F process portion and a second encode card input—output I/F process portion, one of which receives the message from the encoding process manager process portion corresponding to the encoding process type, wherein the first hardware or the second hardware that communicates with the encode card driver process portion encodes the acquired data corresponding to a communication result of one of the first encode card input—output I/F process and the second encode card input—output I/F process to the encode card driver process.

6. The record medium as set forth in claim 5, wherein the encode card driver process portion is communicable with a first encoder for encoding audio data corresponding to ATRAC format and a second encoder for encoding audio data corresponding to MPEG Audio Layer 3 format.

7. The record medium as set forth in claim 1, wherein each process portion is assigned priority.

8. The record medium as set forth in claim 1, wherein if an abnormality takes place in each process portion, the state thereof changes in one of a first path, a second path, and a third path, the first path including a first state to which each process portion advances when it is generated, the second path including a second state to which each process portion advances when it is completed, a third state to which each process portion advances when it is generated, and the first state, the third pass including the second state and a fourth state to which each process portion advances when it is completed.

9. A record medium for recording a computer controllable program, the program being disposed between a controlling portion and hardware, the program controlling the hardware corresponding to a message received from the controlling portion, the program comprising:

a first process portion for communicating with the controlling portion;

a second process portion for being communicable with a first software encoder and a second software encoder;

a third process portion for communicating with the first process portion and the second process portion and executing an interfacing process corresponding to the first software encoder; and a fourth process portion for communicating with the first process portion and the second process portion and executing an interfacing process corresponding to the second software encoder, wherein the first process portion outputs a message to one of the third process portion and the fourth process portion corresponding to a message received from the controlling portion.

10. An information processing apparatus, disposed between a controlling portion and hardware, for controlling the hardware corresponding to a message received from the controlling portion, comprising:

first means for communicating with the controlling portion;

second means for being communicable with first hardware and second hardware;

third means for communicating with said first means and said second means and executing an interfacing process corresponding to the first hardware; and fourth means for communicating with said first means and said second means and executing an interfacing process corresponding to the second hardware, wherein said first means outputs a message to one of said third means and said fourth means corresponding to a message received from the controlling portion.

11. The information processing apparatus as set forth in claim 10, further comprising:

fifth means for communicating with the controlling portion, wherein said fifth means acquires data that is processed by the hardware corresponding to a message received from the controlling portion.

12. The information processing apparatus as set forth in claim 11, wherein said fifth means receives a message that designates the stored location of data from the controlling portion and acquires data that is processed by the hardware corresponding to the stored location of the data, wherein said first means receives a message that designates an encoding process type from the controlling portion, wherein one of said third means and said fourth means receives the message from said first means corresponding to the encoding process type, and wherein the first or second hardware that communicates with said second means encodes the acquired data corresponding to a communication result of one of said third means and said fourth means to said second means.

13. An information processing method for controlling hardware corresponding to a message received from a controlling portion, comprising the steps of:

acquiring data that is processed by the hardware corresponding to a message that designates the stored location of data received from the controlling portion;

executing an interfacing process for a first encoder or a second encoder corresponding to a message that designates an encoding process type, the message being received from the controlling portion;

sending a message that has been interface-processed to the first encoder or the second encoder; and causing the first encoder or the second encoder to encode the acquired data corresponding to the message that has been interface-processed.

14. A storage medium for storing a computer controllable program, disposed between a controlling portion and hardware, for controlling the hardware corresponding to a message received from the controlling portion, the program containing capsulated process portions, wherein if an abnormality takes place in each process portion, it is initialized in one of a first path for initializing a first buffer for exchanging data with the hardware, a second path for unallocating a second buffer for exchanging data with the controlling portion, allocating the second buffer, initializing the second buffer, and initializing the first buffer, and a third path for unallocating the second buffer and unallocating the first buffer.

15. The storage medium as set forth in claim 14, wherein when each process portion is initialized in the first path, if the process portion is not restored from the abnormality, the process portion is initialized in the second path.

16. The storage medium as set forth in claim 15, wherein when each process portion is initialized in the second path, if the process portion is not restored from the abnormality, the process portion is initialized in the third path.

17. The storage medium as set forth in claim 14, wherein when the message type of the message received from the controlling portion is an interrupt and the message number is QUIT, each process portion is initialized in the first path.

18. The storage medium as set forth in claim 14, wherein when the message type of the message received from the controlling portion is an interrupt and the message number is RESET, each process portion is initialized in the second path.

19. The storage medium as set forth in claim 14, wherein each process portion has reply state, manage state, send state, receive state, and ready state.

20. A storage medium for storing a computer controllable program, disposed between a controlling portion and hardware, for controlling the hardware corresponding to a message received from the controlling portion, the program containing capsulated process portions, wherein when an abnormality takes place in each process portion, it is initialized in one of a first path that contains a first initializing state to which the process portion advances when it is generated, a second path that contains a first completion state to which the process portion advances when it is completed, a second initializing state to which the process portion advances when it is generated, and the first initializing state, and a third path that contains the first completion state and a second completion state to which the process portion advances when it is completed.

21. An information processing apparatus, disposed between a controlling portion and hardware, for performing a process corresponding to a program that contains capsulated process portions for controlling the hardware corresponding to a message received from the controlling portion, comprising:

first initializing means that contains a first initializing state to which each process portion advances when it is generated;

second initializing means that contains a first completion state to which the process portion advances when it is completed, a second initializing state to which the process portion advances when it is generated, and the first initializing state; and third initializing means that contains the first completion state and a second completion state to which the process portion advances when it is completed, wherein said first initializing means, said second initializing means, and said third initializing means are executed if an abnormality takes place in the process portion.

22. An information processing method, disposed between a controlling portion and hardware, for performing a process corresponding to a program that contains capsulated process portions for controlling the hardware corresponding to a message received from the controlling portion, comprising the steps of:

a first initializing step that contains a first initializing state to which each process portion advances when it is generated;

a second initializing step that contains a first completion state to which the process portion advances when it is completed, a second initializing state to which the process portion advances when it is generated, and the first initializing state; and a third initializing step that contains the first completion state and a second completion state to which the process portion advances when it is completed, wherein the first initializing step, the second initializing step, and the third initializing step are executed if an abnormality takes place in the process portion.

* * * * *

(12) EX PARTE REEXAMINATION CERTIFICATE (5171st)
United States Patent
Iwatsu

(10) Number: US 6,792,476 C1
(45) Certificate Issued: Aug. 2, 2005

(54) STORAGE MEDIUM, AND METHOD AND APPARATUS FOR INFORMATION PROCESSING

(75) Inventor: Takeshi Iwatsu, Saitama (JP)

(73) Assignee: Sony Corporation, Tokyo (JP)

Reexamination Request:
No. 90/007,319, Nov. 26, 2004

Reexamination Certificate for:
Patent No.: 6,792,476
Issued: Sep. 14, 2004
Appl. No.: 09/869,658
Filed: Jun. 28, 2001

(22) PCT Filed: Oct. 27, 2000

(86) PCT No.: PCT/JP00/07549

§ 371 (c)(1),
(2), (4) Date: Jun. 28, 2001

(87) PCT Pub. No.: WO01/33372

PCT Pub. Date: May 10, 2001

(30) Foreign Application Priority Data

Oct. 29, 1999 (JP) .......................................... 11-308673
Oct. 29, 1999 (JP) .......................................... 11-308674
Oct. 25, 2000 (JP) ....................................... 2000-325218
Oct. 25, 2000 (JP) ....................................... 2000-325219

(51) Int. Cl.[7] ............................................. G06F 13/14
(52) U.S. Cl. ............................... 710/5; 710/39; 710/52;
348/316; 375/240.01; 375/240.03; 375/240.15
(58) Field of Search ............................... 710/5, 39, 52;
348/316; 375/240.01, 240.03, 240.15

(56) References Cited

U.S. PATENT DOCUMENTS 5,905,524 A 5/1999 Sauer

FOREIGN PATENT DOCUMENTS

EP           0905618         3/1999
WO           WO97/19404      5/1997

*Primary Examiner*—Rehana Perveen

(57) ABSTRACT

An information processing apparatus, disposed between a controlling portion and hardware, for performing a process corresponding to a program that contains capsulated process portions for controlling the hardware in response to messages received from the controlling portion. The program includes a first process portion for communicating with the controlling portion; a second process portion for communicating with first and second hardware; a third process portion for communicating with the first process portion and the second process portion and executing an interfacing process corresponding to the first hardware; and a fourth process portion for communicating with the first process portion and the second process portion and executing an interfacing process corresponding to the second hardware. The first process portion outputs a message to either the third process portion or the fourth process portion corresponding to a message received from the controlling portion.

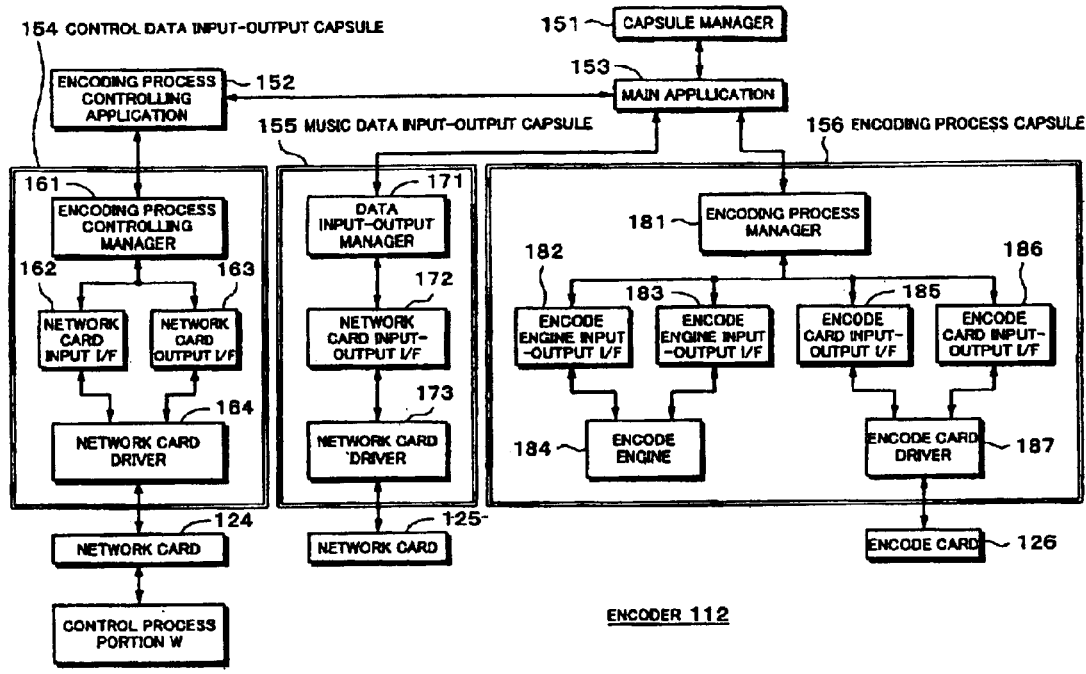

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–22 is confirmed.

\* \* \* \* \*